US012802209B2

(12) United States Patent
Tsukamoto et al.

(10) Patent No.: US 12,802,209 B2
(45) Date of Patent: Nov. 17, 2026

(54) MISALIGNMENT MEASUREMENT SYSTEM, WELDED STEEL PIPE MANUFACTURING FACILITY, IMAGING TERMINAL, IMAGING SYSTEM, INFORMATION PROCESSING DEVICE, MISALIGNMENT MEASUREMENT METHOD, WELDED STEEL PIPE MANUFACTURING METHOD, AND WELDED STEEL PIPE QUALITY CONTROL METHOD

(71) Applicant: JFE STEEL CORPORATION, Tokyo (JP)

(72) Inventors: Yusuke Tsukamoto, Tokyo (JP); Shinichi Haga, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 149 days.

(21) Appl. No.: 18/710,879

(22) PCT Filed: Nov. 15, 2022

(86) PCT No.: PCT/JP2022/042333
§ 371 (c)(1),
(2) Date: May 16, 2024

(87) PCT Pub. No.: WO2023/090307
PCT Pub. Date: May 25, 2023

(65) Prior Publication Data

US 2025/0014171 A1 Jan. 9, 2025

(30) Foreign Application Priority Data

Nov. 18, 2021 (JP) ................................ 2021-187534

(51) Int. Cl.
*G01B 11/27* (2006.01)
*B23K 9/028* (2006.01)
*G06T 7/00* (2017.01)

(52) U.S. Cl.
CPC ............ *G06T 7/001* (2013.01); *B23K 9/0282* (2013.01); *G01B 11/272* (2013.01); *G06T 2207/30136* (2013.01); *G06T 2207/30204* (2013.01)

(58) Field of Classification Search
CPC ........... G06T 7/001; G06T 2207/30136; G06T 2207/30204; B23K 9/0282;
(Continued)

(56) References Cited

U.S. PATENT DOCUMENTS

2004/0045180 A1* 3/2004 Barefoot ............. B23K 31/125 33/501.45
2014/0327761 A1 11/2014 Holzl
(Continued)

FOREIGN PATENT DOCUMENTS

CN 206208138 U 5/2017
EP 2 801 788 B1 12/2019
(Continued)

OTHER PUBLICATIONS

Feb. 27, 2024 Office Action issued in Japanese Patent Application No. 2023-514711.
(Continued)

*Primary Examiner* — Isiaka O Akanbi
(74) *Attorney, Agent, or Firm* — Oliff PLC

(57) ABSTRACT

A misalignment measurement system of the present invention includes: a marker plate on which a pattern serving as a length reference for length measurement is drawn; an imaging unit configured to image, as image data together with the marker plate, a bead portion in a cross section of a
(Continued)

welded portion on which the marker plate is provided; and an arithmetic device configured to calculate a misalignment amount of the bead portion based on the image data captured by the imaging unit.

15 Claims, 23 Drawing Sheets

(58) Field of Classification Search
CPC .............. B23K 2101/10; B23K 31/125; G01B 11/272; G01B 3/02; G01B 11/27; G01B 11/26; B21C 51/00; B21C 37/08
USPC .................................................. 356/399–401
See application file for complete search history.

(56) References Cited

U.S. PATENT DOCUMENTS

| | | | | |
|---|---|---|---|---|
| 2020/0292102 | A1* | 9/2020 | Ducceschi | B23K 33/006 |
| 2021/0003394 | A1* | 1/2021 | Strunk | G01B 11/272 |
| 2023/0334653 | A1* | 10/2023 | Elhossini | G06T 7/001 |
| 2023/0349840 | A1* | 11/2023 | Pantsar | G01N 23/18 |

FOREIGN PATENT DOCUMENTS

| | | | |
|---|---|---|---|
| JP | S56-99401 | U | 8/1981 |
| JP | 2877776 | B2 | 3/1999 |
| JP | 2008-119711 | A | 5/2008 |
| JP | 2010-249650 | A | 11/2010 |
| JP | 2019-056391 | A | 4/2019 |
| JP | 2019-105593 | A | 6/2019 |

OTHER PUBLICATIONS

Feb. 7, 2023 International Search Report issued in International Patent Application No. PCT/JP2022/042333.
Jan. 20, 2025 extended Search Report issued in European Patent Application No. 22895588.6.
Dec. 9, 2025 Office Ation issued in Korean Patent Application No. 10-2024-7016038.

* cited by examiner (a)

(b)

MISALIGNMENT MEASUREMENT SYSTEM, WELDED STEEL PIPE MANUFACTURING FACILITY, IMAGING TERMINAL, IMAGING SYSTEM, INFORMATION PROCESSING DEVICE, MISALIGNMENT MEASUREMENT METHOD, WELDED STEEL PIPE MANUFACTURING METHOD, AND WELDED STEEL PIPE QUALITY CONTROL METHOD

FIELD

The present invention relates to a misalignment measurement system, a welded steel pipe manufacturing facility, an imaging terminal, an imaging system, an information processing device, a misalignment measurement method, a welded steel pipe manufacturing method, and a welded steel pipe quality control method.

BACKGROUND

Welded steel pipes are steel pipe products manufactured by molding a steel plate into a pipe shape and welding the steel plate. UOE steel pipes among the welded steel pipes are manufactured by performing press-molding into a U shape and an O shape and performing seam welding from the inner and outer surfaces by a submerged arc welding method. A process of manufacturing a UOE steel pipe briefly includes: 1) edge preparation and crimping press; 2) U press; 3) O press; 4) welding (tack, welding from inner surface of steel pipe, and welding from outer surface of steel pipe); 5) mechanical pipe expansion; 6) end surface finishing; and 7) inspection. UOE steel pipes are used for applications of gas/oil transportation, running water, and boiler/pressure vessel. The UOE steel pipes leave no margin for insufficient strength of a steel pipe, particularly, a welded portion and occurrence of leakage. Strength inspections such as a water pressure test and flaw inspections using magnetism, ultrasonic waves, and X-rays are performed. In recent years, API5L, which is a standard for steel pipes, has been revised to specify misalignment, that is, deviation of a weld bead formed by welding from the inner surface of a welded steel pipe and welding from the outer surface of the welded steel pipe. In view of this, it is expected that control of misalignment will be further tightened in the future. As a standard requirement, misalignment measurement for a weld bead in a cross section of a pipe end may be required. Since the misalignment measurement in this case includes complicated manual measurement, a factory operator largely performs the measurement manually. As a result, a load is applied to the measurement, and the measurement requires a lot of time. Therefore, it is considered that automation or semi-automation of the misalignment measurement will be required in the future. Patent Literature 1 discloses a method of measuring misalignment (also referred to as off-seam) by extracting, from a radiation transmission image, a position of a toe line of respective weld beads formed by welding from an inner surface and welding from an outer surface.

CITATION LIST

Patent Literature

Patent Literature 1: Japanese Patent No. 2877776

SUMMARY

Technical Problem

The measurement method disclosed in Patent Literature 1 was used before the revision of API5L above, and is different from a misalignment measurement method based on the current API5L specification. Thus, misalignment cannot be automatically measured based on the shape of a boundary between a bead portion and a base material in a cross section of a welded portion of a welded steel pipe.

The present invention has been made in view of the above-described problem, and an object thereof is to provide a misalignment measurement system, a welded steel pipe manufacturing facility, an imaging terminal, an imaging system, an information processing device, a misalignment measurement method, a welded steel pipe manufacturing method, and a welded steel pipe quality control method capable of automatically measuring misalignment based on the shape of a boundary of a bead portion and a base material in a cross section of a welded portion.

Solution to Problem

To solve the above-described problem and achieve the object, (1) a misalignment measurement system according to the present invention includes: a marker plate on which a pattern serving as a length reference for length measurement is drawn; an imaging unit configured to image, as image data together with the marker plate, a bead portion in a cross section of a welded portion on which the marker plate is provided; and an arithmetic device configured to calculate a misalignment amount of the bead portion based on the image data captured by the imaging unit.

(2) Moreover, the misalignment measurement system of the present invention according to the above described invention (1) further includes an imaging terminal including the imaging unit and the arithmetic device.

(3) Moreover, in the misalignment measurement system of the present invention according to the above described invention (1) or (2), a marker for three-dimensional survey is drawn on the marker plate as the pattern.

(4) Moreover, a welded steel pipe manufacturing facility according to the present invention includes: a manufacturing facility configured to manufacture a welded steel pipe; and the misalignment measurement system according to any one of the above described inventions (1) to (3) configured to measure misalignment for a welded portion of a welded steel pipe manufactured in the manufacturing facility.

(5) Moreover, an imaging terminal according to the present invention includes: an imaging unit configured to image, as image data together with an external marker plate, a bead portion in a cross section of a welded portion on which the external marker plate is provided, wherein a pattern serving as a length reference for length measurement is drawn on the external marker plate; and a second arithmetic unit configured to execute at least one of: processing of outputting the image data that has been captured to an external first arithmetic unit configured to execute processing of calculating a misalignment amount of the bead portion based on the image data; and processing of calculating a misalignment amount of the bead portion based on the image data that has been captured.

(6) Moreover, an imaging system for measuring misalignment of the bead portion according to the present invention includes: a marker plate on which a pattern serving as a length reference for length measurement is drawn; and an imaging terminal configured to image a bead portion in a cross section of a welded portion on which the marker plate is provided, the imaging terminal including: an imaging unit configured to image the bead portion as image data together with the marker plate; and a second arithmetic unit configured to execute processing of outputting the image data that has been captured to an external first arithmetic unit configured to execute processing of calculating a misalignment amount of the bead portion based on the image data.

(7) Moreover, an information processing device according to the present invention includes a first arithmetic unit configured to: execute processing of calculating a misalignment amount of a bead portion based on image data in which a bead portion in a cross section of a welded portion on which an external marker plate is provided is imaged together with the marker plate, wherein a pattern serving as a length reference for length measurement is drawn on the external marker plate, and execute processing of outputting the misalignment amount that has been calculated to a preset target.

(8) Moreover, an information processing device according to the present invention includes a third arithmetic unit configured to execute, based on: a misalignment amount of the bead portion in a cross section of the welded portion on which an external marker plate is provided calculated from image data in which the bead portion is imaged together with the marker plate, a pattern serving as a length reference for length measurement being drawn on the external marker plate; and a plurality of pieces of information on the product, at least one of: processing of changing a manufacturing condition of a product including a welded portion of a bead portion whose misalignment amount has been calculated; and processing of determining a degree of quality of the product.

(9) Moreover, a misalignment measurement method according to the present invention includes: a projective transformation step of projectively transforming image data in which a bead portion in a cross section of a welded portion on which a marker plate is provided is imaged together with the marker plate, wherein a pattern serving as a length reference for length measurement is drawn on the marker plate; and misalignment amount calculation step of calculating a misalignment amount of the bead portion from image data after projective transformation.

(10) Moreover, the misalignment measurement method of the present invention according to the above-described invention (9) further includes an imaging step of imaging the bead portion as image data together with the marker plate before the projective transformation step.

(11) Moreover, in the misalignment measurement method of the present invention according to the above-described invention (10), an imaging condition in the imaging step is changed based on information including at least the misalignment amount.

(12) Moreover, a welded steel pipe manufacturing method according to the present invention includes: a manufacturing step of a welded steel pipe; and a measurement step of measuring misalignment for a welded portion of the welded steel pipe manufactured in the manufacturing step by the misalignment measurement method according to any one of the above-described inventions (9) to (11).

(13) Moreover, a welded steel pipe manufacturing method according to the present invention includes: a manufacturing step of a welded steel pipe; and a control step of controlling a manufacturing condition of the manufacturing step based on a plurality of pieces of information including a misalignment amount of the bead portion calculated from image data in which a bead portion in a cross section of a welded portion of the welded steel pipe is imaged together with an external marker plate, wherein a pattern serving as a length reference for length measurement is drawn on the marker plate, and the external marker plate is provided on the cross section of the welded portion.

(14) Moreover, a welded steel pipe quality control method according to the present invention includes: a measurement step of measuring misalignment for a welded portion of a welded steel pipe by the misalignment measurement method according to any one of the above-described inventions (9) to (11); and a quality control step of controlling quality of the welded steel pipe based on a result of measurement of misalignment of the welded portion obtained by the measurement step.

(15) A welded steel pipe quality control method according to the present invention includes a quality control step of controlling quality of a welded steel pipe based on a plurality of pieces of information including a misalignment amount of the bead portion calculated from image data in which a bead portion in a cross section of a welded portion of the welded steel pipe is imaged together with an external marker plate, wherein a pattern serving as a length reference for length measurement is drawn on the marker plate, and the external marker plate is provided on a cross section of the welded portion.

Advantageous Effects of Invention

A misalignment measurement system, a welded steel pipe manufacturing facility, an imaging terminal, an imaging system, an information processing device, a misalignment measurement method, a welded steel pipe manufacturing method, and a welded steel pipe quality control method according to the present invention have an effect that misalignment can be automatically measured based on the shape of a boundary of a bead portion and a base material in a cross section of a welded portion.

BRIEF DESCRIPTION OF DRAWINGS

FIG. 2(*b*) illustrates a misalignment amount calculation method.

FIG. 10(*b*) illustrates a method of detecting a right edge of the marking region.

FIG. 14(*b*) illustrates processing performed on a right intersection.

FIG. 26(*b*) illustrates a boundary of a welded portion and a base material of the sample. FIG. 26(*c*) illustrates a left boundary, a right boundary, and respective intersections.

DESCRIPTION OF EMBODIMENTS

First Embodiment

A first embodiment of a misalignment measurement system, a welded steel pipe manufacturing facility, a misalignment measurement method, a welded steel pipe manufacturing method, and a welded steel pipe quality control method according to the present invention will be described below. Note that the present invention is not limited by the embodiment. Note that, here, the misalignment refers to deviation between weld beads formed by welding from one surface of a metal material to be welded and welding from the other surface opposite to the one surface of the metal material. Therefore, when a welded steel pipe is selected to be measured as in the embodiment, the misalignment refers to deviation between weld beads formed by welding from the inner surface of the welded steel pipe and welding from the outer surface of the welded steel pipe. Furthermore, unless otherwise specified, a bead refers to a weld bead formed by welding.

Figure 1:
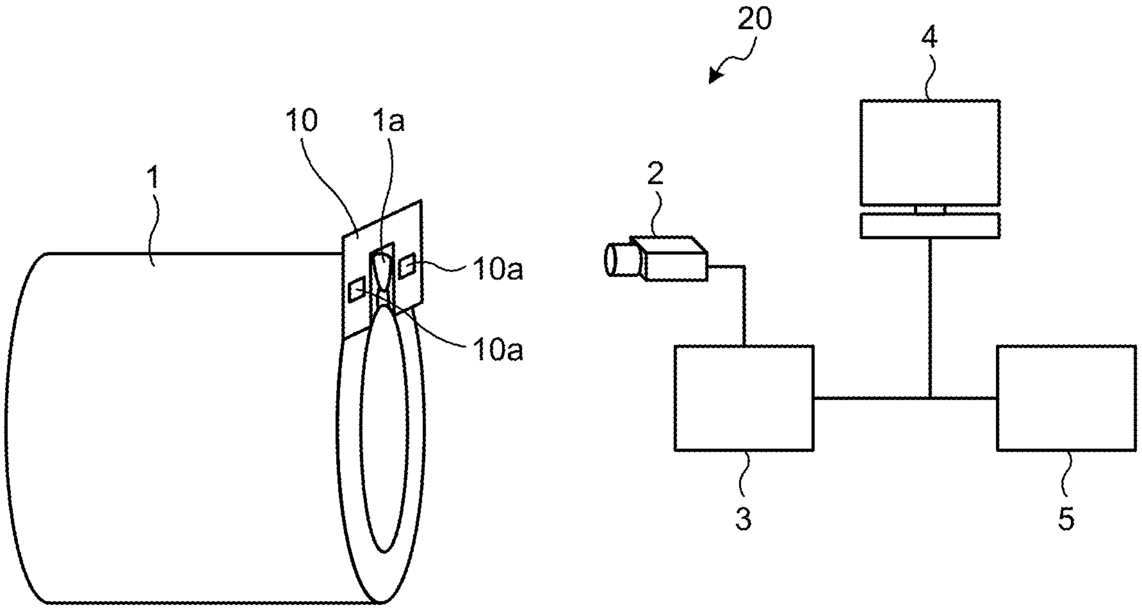
FIG. 1 illustrates one example of a misalignment measurement system according to an embodiment.

FIG. 1 illustrates one example of a misalignment measurement system 20 according to the first embodiment.

The misalignment measurement system 20 according to the first embodiment includes an imaging unit 2, an arithmetic device 3, a display device 4, a storage device 5, and a marker plate 10.

The imaging unit 2 is an imaging instrument for imaging a welded steel pipe 1 and the like to be measured as image data, and is, for example, a monochrome camera or a color camera. Note that a color camera is preferably used as the imaging unit 2. Furthermore, the imaging unit 2 is preferably designed such that a predetermined resolution can be secured at the time of imaging a cross section of a welded portion of the welded steel pipe 1. Note that, when the installation position of the imaging unit 2 can be changed within a predetermined range, the imaging unit 2 is preferably designed such that a predetermined resolution can be secured at all positions within the predetermined range.

The arithmetic device 3 is an arithmetic instrument for performing image processing such as projective transformation to be described later on image data captured by the imaging unit 2 and calculating a misalignment amount of the welded steel pipe 1. The arithmetic device 3 is, for example, a computer equipped with a central processing unit (CPU).

The display device 4 is a display instrument for displaying information including the misalignment amount calculated by the arithmetic device 3. The display device 4 is, for example, a liquid crystal display. Note that, in addition to the misalignment amount calculated by the arithmetic device 3, the display device 4 may simultaneously display image data captured by the imaging unit 2, image data obtained as a result of the arithmetic device 3 performing projective transformation and image processing on the image data, and the like.

The storage device 5 is a storage instrument for storing the information including the misalignment amount calculated by the arithmetic device 3. The storage device 5 is, for example, a hard disk drive. Furthermore, the storage device 5 may also store image data captured by the imaging unit 2, image data obtained as a result of the arithmetic device 3 performing projective transformation and image processing on the image data, and the like.

When the imaging unit 2 images the cross section of the welded portion of the welded steel pipe 1, the marker plate 10 is attached to the cross section of the welded steel pipe 1 to be measured. The marker plate 10 is used for measuring a length in the cross section of the welded steel pipe 1. A pattern 10*a* having a known length is drawn on the surface of the marker plate 10. The pattern 10*a* having a known length preferably includes one or a plurality of square patterns having known length of sides and one or a plurality of AR markers (e.g., Aruco), which are markers for a three-dimensional survey. The marker plate 10 is preferably attached to the cross section of the welded steel pipe 1 or the surface of the welded steel pipe 1 with a magnet or the like so as to be easily detached. Furthermore, in order to improve the accuracy of projective transformation to be described later, as many patterns 10*a* drawn on the marker plate 10 as possible are preferably used. Moreover, a bead portion 1*a* of a cross section in the welded portion of the welded steel pipe 1 and the pattern 10*a* are preferably disposed as on the same plane as possible. Moreover, the marker plate 10 preferably has a small structure so that the imaging unit 2 can image the entire marker plate 10 in a case of performing imaging from a place where the imaging unit 2 is disposed under a usual operation method.

Note that, in order to achieve simple measurement, as described in a second embodiment to be described later, the imaging unit 2, the arithmetic device 3, and the display device 4 may be replaced with an imaging terminal 6 having functions equivalent to the functions thereof.

Next, the misalignment amount measurement method will be described.

Figure 2:
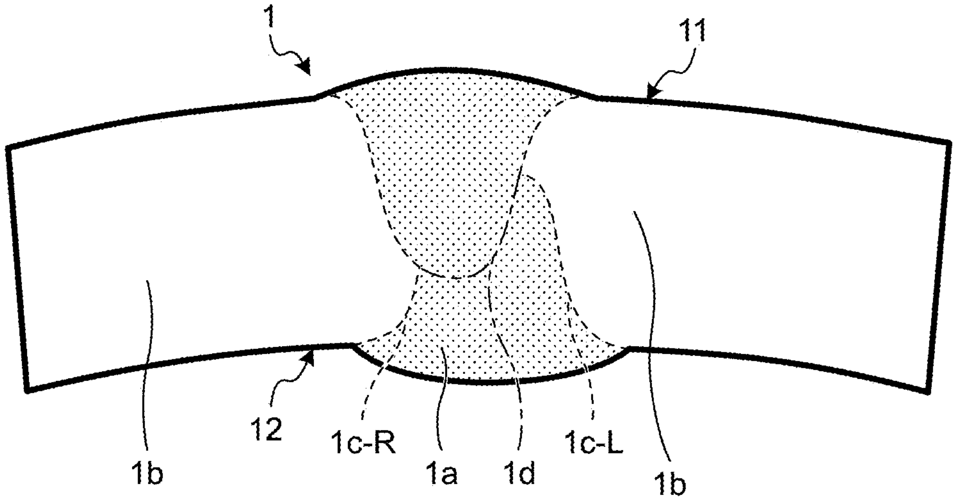
FIG. 2(*a*) is an enlarged view illustrating a cross section of a welded steel pipe.
Figure 2:
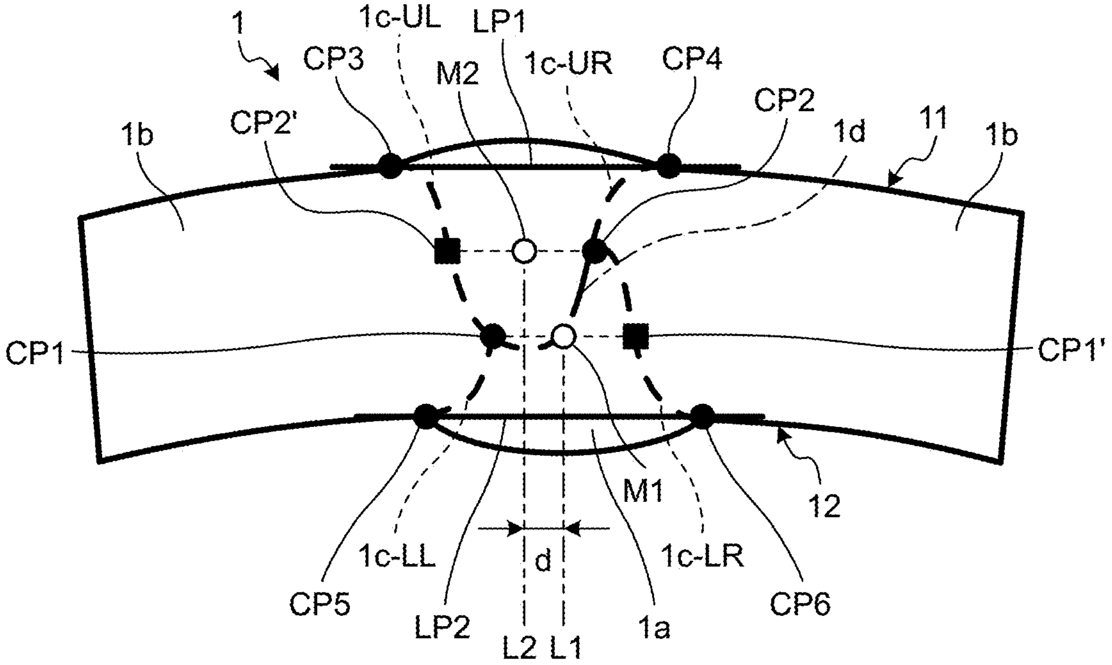

FIG. 2(*a*) is an enlarged view illustrating the cross section of the welded portion of the welded steel pipe 1. Welding is performed from the inner surface and the outer surface of the welded steel pipe 1. Thus, the bead portion 1*a* is formed in a form (hatched portion in FIG. 2(*a*)) in which a bead extending from the inner surface (lower side in FIG. 2(*a*)) toward the outer surface side (upper side in FIG. 2(*a*)) and a bead extending from the outer surface (upper side in FIG. 2(*a*)) toward the inner surface side (lower side in FIG. 2(*a*)) are joined together. A reference sign 1*b* in FIG. 2 denotes a base material of the welded steel pipe 1. Furthermore, a reference sign 1*c* (dotted line in FIG. 2(*a*)) in FIG. 2 denotes a boundary between the bead portion 1*a* and the base material portion 1*b*. Furthermore, a reference sign 1*d* (chain line in FIG. 2(*a*)) in FIG. 2 denotes an outer peripheral line of the bead extending from the outer surface (upper side in FIG. 2(*a*)) toward the inner surface side (lower side in FIG. 2(*a*)).

FIG. 2(*b*) illustrates a misalignment amount calculation method. Note that, in the following description, a boundary appearing on the left side in FIG. 2(*b*) of the boundary 1*c* generated by welding from an inner surface 12 of the welded steel pipe 1 is defined as a boundary 1*c*-LL, and a boundary appearing on the right side in FIG. 2(*b*) is defined as a boundary 1*c*-LR. Furthermore, a boundary appearing on the left side in FIG. 2(*b*) of the boundary 1*c* generated by welding from an outer surface 11 of the welded steel pipe 1 is defined as a boundary 1*c*-UL, and a boundary appearing on the right side in FIG. 2(*b*) is defined as a boundary 1*c*-UR.

First, positions of intersections of the boundary 1*c*-LL and the boundary 1*c*-LR and a boundary 1*c*-U are identified on the right and left sides in FIG. 2(*b*). The boundary 1*c*-LL and the boundary 1*c*-LR are generated by the welding from the inner surface 12 of the welded steel pipe 1. The boundary 1*c*-U is generated by the welding from the outer surface 11 of the welded steel pipe 1. Each intersection is indicated by a black circle in FIG. 2(*b*). For example, an intersection of the boundary 1*c*-LL generated by the welding from the inner surface 12 of the welded steel pipe 1 and the boundary 1*c*-UL generated by the welding from the outer surface 11 of the welded steel pipe 1 is a left intersection CP1 in FIG. 2(*b*). Similarly, an intersection of the boundary 1*c*-LR generated by the welding from the inner surface 12 of the welded steel pipe 1 and the boundary 1*c*-UR generated by the welding from the outer surface 11 of the welded steel pipe 1 is a right intersection CP2 in FIG. 2(*b*).

Next, other intersections of straight lines parallel to the outer surface 11 of the welded steel pipe 1 passing through the left intersection CP1 and the right intersection CP2 and the boundary 1*c* are determined. Note that, the straight lines parallel to the outer surface 11 of the welded steel pipe 1 can be parallel to a straight line LP1 connecting intersections CP3 and CP4 of the outer surface 11 of the welded steel pipe 1 and the boundaries 1*c*-UL and 1*c*-UR as illustrated in FIG. 2(*b*), for example.

Each intersection is indicated by a black square in FIG. 2(*b*). Then, a straight line passing through the left intersection CP1 and parallel to the outer surface 11 of the welded steel pipe 1 is drawn. An intersection CP1', at which the straight line intersects the boundary 1*c*, other than the left intersection CP1 is determined. Similarly, a straight line passing through the right intersection CP2 and parallel to the outer surface 11 of the welded steel pipe 1 is drawn. An intersection CP2', at which the straight line intersects the boundary 1*c*, other than the right intersection CP2 is determined.

Subsequently, midpoints of the left intersection CP1 and the right intersection CP2 and the intersection CP1' and the intersection CP2' respectively corresponding thereto are determined. Each midpoint is indicated by a white circle in FIG. 2(*b*). Then, a midpoint of the left intersection CP1 and the intersection CP1' is defined as a midpoint M1. Similarly, a midpoint of the right intersection CP2 and the intersection CP2' is defined as a midpoint M2.

Finally, as indicated by two-dot chain lines in FIG. 2(*b*), straight lines passing through the midpoints M1 and M2 and perpendicular to the outer surface 11 of the welded steel pipe 1 are drawn. For example, a straight line L1 perpendicular to the outer surface 11 of the welded steel pipe 1 passing through the midpoint M1 and a straight line L2 perpendicular to the outer surface 11 of the welded steel pipe 1 passing through the midpoint M2 can be drawn.

A length obtained by measuring a distance between the straight lines L1 and L2 obtained by the above-described procedure in a direction parallel to the outer surface 11 of the welded steel pipe 1 is a misalignment amount d. As described above, the misalignment measurement system 20 for the welded steel pipe 1 according to the first embodiment can automatically measure misalignment based on the shape of the boundary 1*c* between the bead portion 1*a* (welded portion) and the base material portion 1*b* in the cross section of the welded portion of the welded steel pipe 1.

The misalignment measurement method has been described above.

Figure 3:
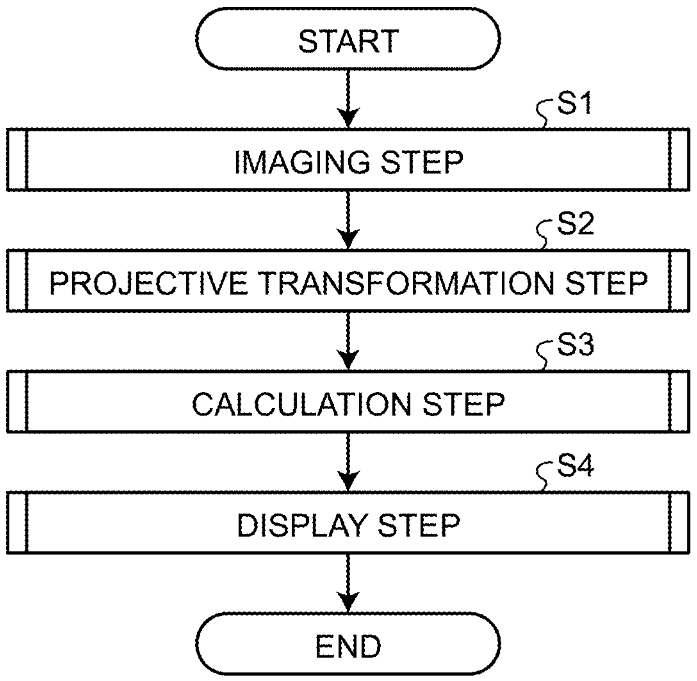
FIG. 3 is a flowchart illustrating a measurement procedure in a misalignment measurement method according to the embodiment.

Next, the misalignment measurement method according to the first embodiment will be specifically described. FIG. 3 is a flowchart illustrating a measurement procedure in the misalignment measurement method according to the first embodiment.

The measurement procedure in the misalignment measurement method according to the first embodiment includes an imaging step S1, a projective transformation step S2, a calculation step S3, and a display step S4. In the imaging step S1, the bead portion 1*a* in the cross section of the welded steel pipe 1 to which the marker plate 10 is attached is imaged. In the projective transformation step S2, image data is projectively transformed from the imaged marker plate 10 into a confronting image data having a predetermined resolution. In the calculation step S3, a misalignment amount is calculated from the image data after the projective transformation. In the display step S4, information including the calculated misalignment amount is presented.

Figure 4:
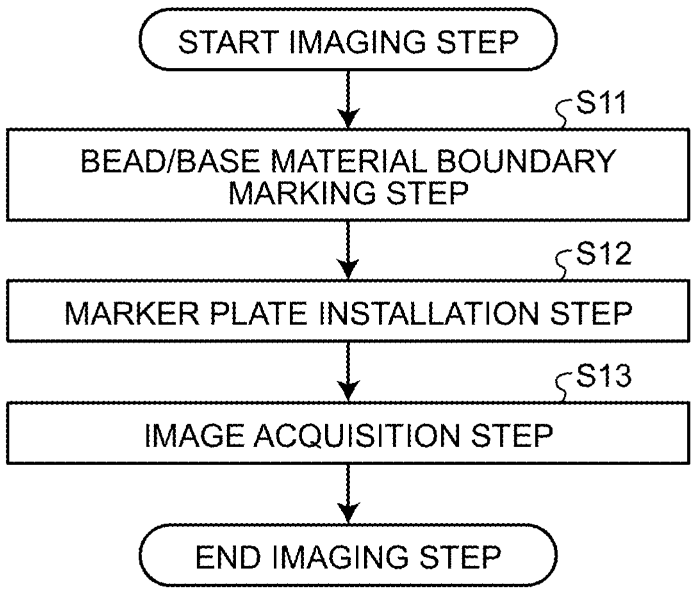
FIG. 4 is a flowchart illustrating details of an imaging step.

FIG. 4 is a flowchart illustrating details of the imaging step S1.

The imaging step S1 includes a bead/base material boundary marking step S11, a marker plate installation step S12, and an image acquisition step S13.

When the imaging step S1 is started, first, the bead/base material boundary marking step S11 is performed. In the bead/base material boundary marking step S11, the boundary 1*c* and the outer peripheral line 1*d* are traced and marked with a writing instrument such as a pen. The writing instrument to be used preferably does not leave a scratch and corrosion to a steel pipe to be measured, and is easily removed from the steel pipe after the measurement and the like. Furthermore, for accurate measurement, the thickness of a line of the writing instrument is preferably equal to or less than an error of a misalignment amount required in measurement, for example, 0.5 [mm] or less.

In terms of optical characteristics of handwriting of the writing instrument, the handwriting can be preferably discriminated easily from rust generated on the steel pipe and an object reflected on a cross section of the steel pipe in order to facilitate detection of the boundary 1*c* and the outer peripheral line 1*d* from the image data in image processing to be described later. For example, when a color camera is used as the imaging unit 2, blue or green, which is generally unlikely to be confused with rust of a steel pipe, is preferably used. In contrast, when a monochrome camera is used as the imaging unit 2, a writing instrument that leaves handwriting having a luminance value clearly different from that of the cross section of the welded steel pipe 1 is preferred. A writing instrument made of a material in which a handwriting portion does not transmit and reflect light at all is preferably used. Thus, only a handwriting portion is darkly imaged by irradiating the cross section of the welded steel pipe 1 with diffused light, which facilitates extraction of the handwriting.

Next, when the above-described processing of the bead/base material boundary marking step S11 ends, the marker plate installation step S12 is performed in the imaging step S1. In the marker plate installation step S12, the marker plate 10 is disposed near the bead portion 1*a* in the cross section of the welded portion of the welded steel pipe 1. In this case, the marker plate 10 is disposed so as not to hide the marking of the boundary 1*c* and the outer peripheral line 1*d* traced in the bead/base material boundary marking step S11. Furthermore, the bead portion 1*a* and a pattern of the marker plate 10 are preferably disposed as on the same plane as possible.

Next, when the above-described processing of the marker plate installation step S12 ends, the image acquisition step S13 is performed in the imaging step S1. In the image acquisition step S13, the boundary 1*c* and the outer peripheral line 1*d*, which have been marked, and the marker plate 10 are imaged. Note that, in this case, the entire marking of the boundary 1*c* and the outer peripheral line 1*d* traced in the bead/base material boundary marking step S11 and all patterns drawn on the marker plate 10 are preferably imaged at a time.

Then, in the misalignment measurement method according to the first embodiment, after the above-described processing of the image acquisition step S13 is performed, the imaging step S1 is ended, and the processing proceeds to the subsequent projective transformation step S2.

Figure 5:
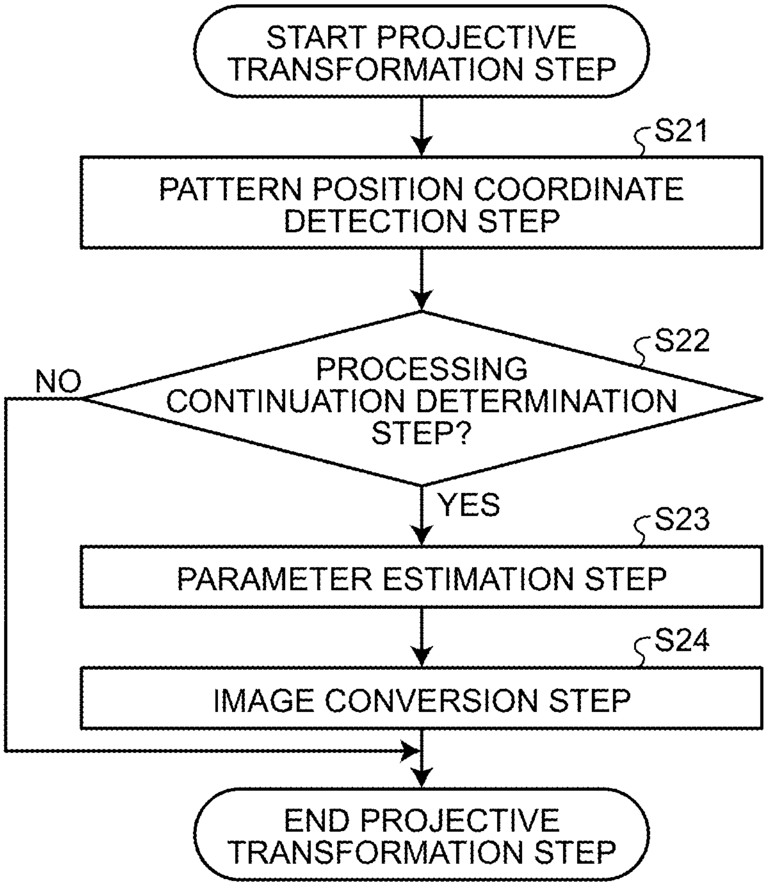
FIG. 5 is a flowchart illustrating details of a projective transformation step.

FIG. 5 is a flowchart illustrating details of the projective transformation step S2.

The projective transformation step S2 includes a pattern position coordinate detection step S21, a processing continuation determination step S22, a parameter estimation step S23, and an image conversion step S24.

When the projective transformation step S2 is started, first, the pattern position coordinate detection step S21 is performed. In the pattern position coordinate detection step S21, the position of a pattern on the marker plate 10 is detected from image data, and coordinates (hereinafter, referred to as "image coordinates") on the image data of the pattern are acquired. Note that, here, as many patterns as possible are detected from the image data, and image coordinates of positions (centers or vertices) of patterns that have been successfully detected are listed.

Figure 6:
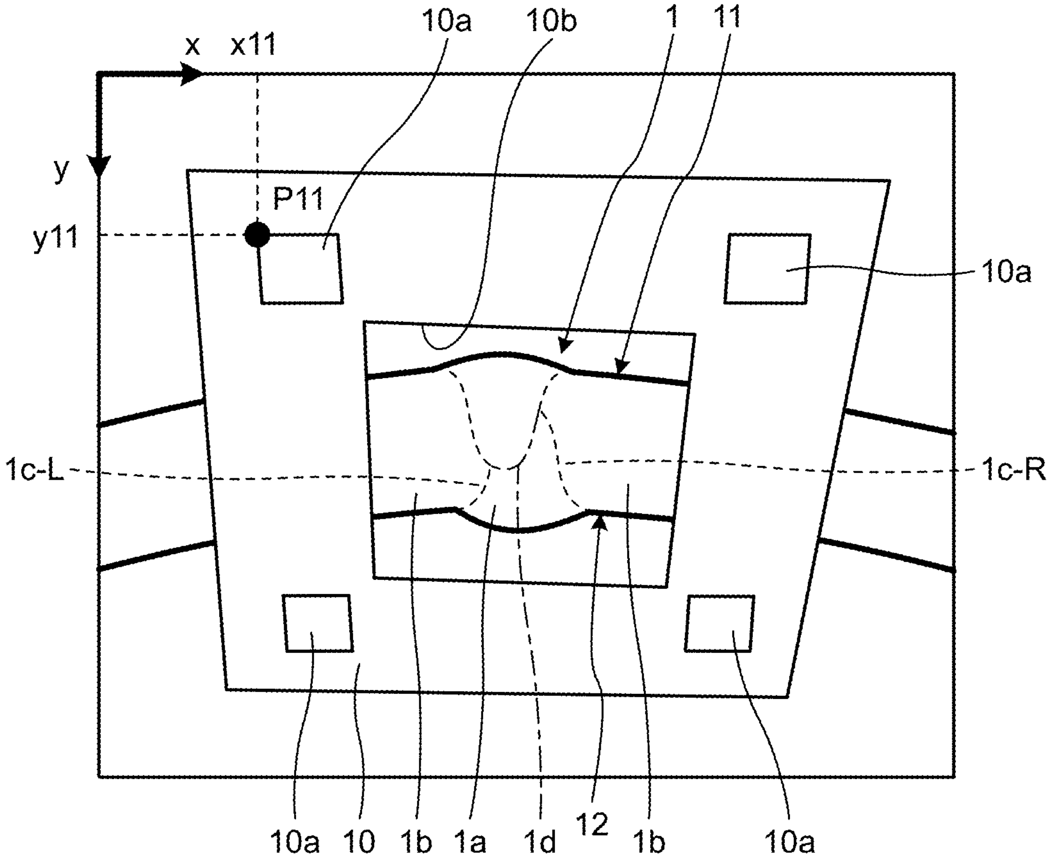
FIG. 6 illustrates one example of image data of a marked boundary and a marker plate captured in the imaging step.

FIG. 6 illustrates one example of image data of the boundary 1*c* and the outer peripheral line 1*d*, which have been marked, and the marker plate 10. The boundary 1*c*, the outer peripheral line 1*d*, and the marker plate 10 have been imaged in the imaging step S1. Here, the marker plate 10 is obtained by creating a rectangular opening 10*b* in a central portion of a rectangular flat plate. Furthermore, patterns 10*a* are disposed near the four corners of the marker plate 10. Note that the shape of the marker plate 10 and the positions of the patterns 10*a* are not limited to the shape and the positions in FIG. 6.

An upper left in the image data is defined as an origin. A right direction in the image data is defined as a positive direction of an x-axis. A lower direction in the image data is defined as a positive direction of a y-axis. Image coordinates of a pattern 10*a* are expressed by the pixel number of pixels along the respective axial directions. For example, when an upper left vertex P11 in an upper left pattern 10*a* in FIG. 6 is successfully detected, the image coordinates of the upper left vertex P11 is determined as follows. That is, starting from the origin at the upper left in the image data, a point advances by x11 pixels along the x-axis direction, and advances by y11 pixels along the y-axis direction. The point reaches the upper left vertex P11. The image coordinates of the upper left vertex P11 are thus (x11, y11). Similarly, for each of all successfully detected patterns k=1, 2, . . . , and K, image coordinates (xkn, ykn) of all successfully detected center or vertices Pkn (n=1, 2, . . . , and Nk) are listed.

Furthermore, when acquisition of a large number of image coordinates from a small number of patterns 10*a* is desired, the pattern 10*a* preferably has a shape having vertices, such as a rectangle. In contrast, when easiness of detection processing and image coordinate acquisition processing is pursued, it is preferable that the pattern 10*a* has a point symmetrical shape such as a circle and image coordinates of the center position of the shape are detected. Furthermore, a pattern for which a detection method and an image coordinate acquisition method have been established may be used as the pattern 10*a*.

Next, when the above-described processing of the pattern position coordinate detection step S21 ends, the processing continuation determination step S22 is performed in the projective transformation step S2. In the processing continuation determination step S22, the number of vertices Pkn detected in the pattern position coordinate detection step S21 are counted, and whether or not projective transformation can be performed is determined. In general, in order to perform projective transformation, image coordinates are required to correspond to actual coordinates in three-dimensional space at four or more points. Thus, when less than four vertices Pkn are detected (No in processing continuation determination step S22), the subsequent parameter estimation step S23 and image conversion step S24 are skipped, a flag indicating failure of image conversion is set, and the projective transformation step S2 ends.

In contrast, when four or more vertices Pkn are detected (Yes in processing continuation determination step S22), the parameter estimation step S23 is performed. In the parameter estimation step S23, a parameter of projective transformation of captured image data is estimated and the transformation is performed by using image coordinates of vertices Pkn detected in the pattern position coordinate detection step S21.

Figure 7:
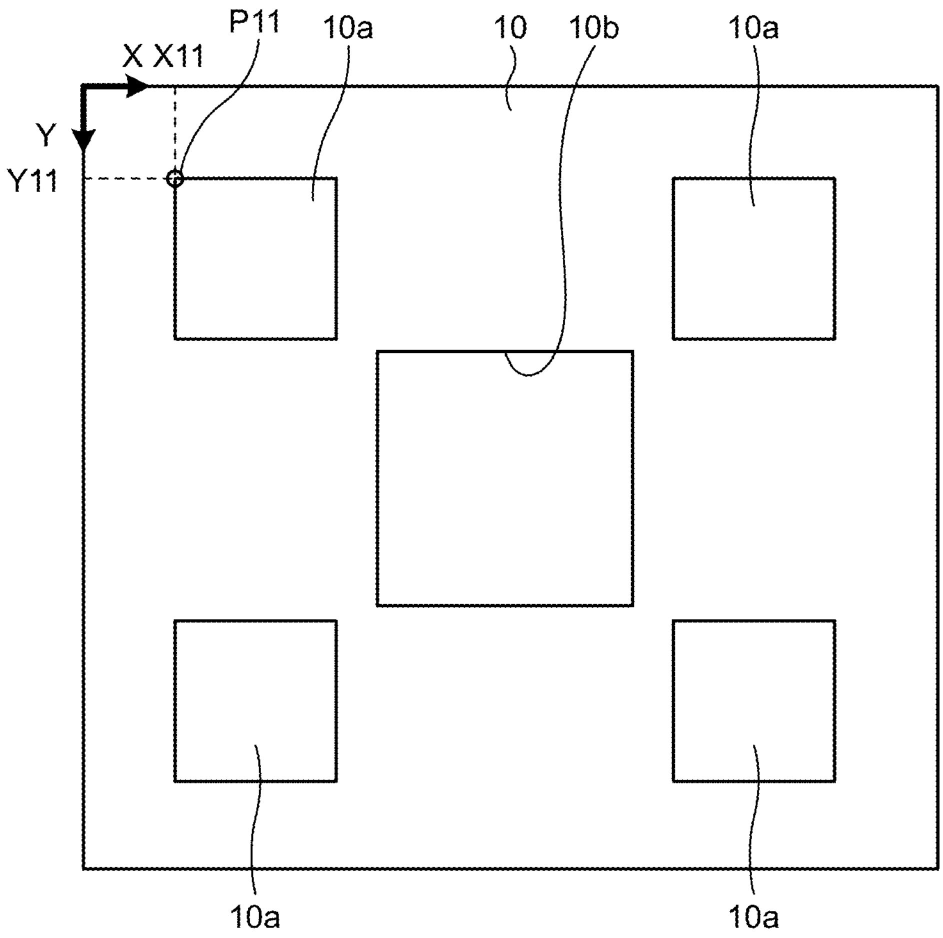
FIG. 7 illustrates an example of the dimension of the marker plate in FIG. 6.

First, before the parameter of the projective transformation is estimated, a resolution r in the image data after the projective transformation is set as a parameter. It is preferable that the resolution r in the image data after projective transformation is coarser than the resolution of original image data and smaller than an allowable error of a misalignment amount. The resolution r is preferably set as, for example, 0.2 [mm]. In the case of projective transformation, actual coordinates (hereinafter, referred to as "object coordinates") of the vertices Pkn of the pattern 10*a* are preset. FIG. 7 illustrates an example of the dimension of the marker plate 10 in FIG. 6. Note that the shape of the marker plate 10 and the positions of the patterns 10*a* are not limited to the shape and the positions in FIG. 7.

An upper left of the marker plate 10 is defined as an origin. A right direction of the marker plate 10 is defined as a positive direction of an X-axis. A lower direction of the marker plate 10 is defined as a positive direction of a Y-axis. The object coordinates of the pattern 10*a* are expressed by lengths (in unit of, for example, [mm]) along the respective axial directions. For example, the object coordinates of an upper left vertex P11 in an upper left pattern 10*a* in FIG. 7 are determined as follows. That is, starting from the origin at the upper left of the marker plate 10, a point advances by X11 [mm] along the X-axis direction, and advances by Y11 [mm] along the Y-axis direction. The point reaches the upper left vertex P11. The object coordinates of the upper left vertex P11 are thus (X11, Y11). Similarly, for each of all successfully detected patterns k=1, 2, . . . , and K, object coordinates (Xkn, Ykn) of all successfully detected center or vertices Pkn (n=1, 2, . . . , and Nk) are listed.

The above-described operation clarifies the correspondence relations between the object coordinates (Xkn, Ykn) and the image coordinates (xkn, ykn) for all the successfully detected vertices Pkn. The parameter of the projective transformation is calculated from these correspondence relations.

The projective transformation is one of image deformation processing. In the projective transformation, image data is deformed by moving image coordinates (x, y) to other image coordinates (x', y') based on Mathematical Expressions (1) and (2) below.

$$x' = \frac{Ax + By + C}{Gx + Hy + 1} \tag{1}$$

$$y' = \frac{Dx + Ey + F}{Gx + Hy + 1} \tag{2}$$

Here, in Mathematical Expressions (1) and (2) above, A, B, C, D, E, F, G, and H are parameters of the projective transformation.

When captured image data is projectively transformed by using an appropriate parameter, the correspondence relation between one pixel of the image data after the projective transformation and an actual length, that is, the resolution r of the image data after the projective transformation can be optionally determined. This enables measurement of a length of the bead portion 1*a* on the image data by projectively transforming the image data obtained by imaging the bead portion 1*a* of the welded steel pipe 1.

In order to calculate a parameter of the projective transformation, it is necessary to image at least four or more "points" arranged on the same plane and acquire the correspondence relations between object coordinates (X, Y) and image coordinates (x, y). In the embodiment, the correspondence relations between object coordinates and image coordinates are acquired by arranging the center and vertices of the pattern 10*a* at a predetermined positions. Therefore, when the marker plate 10 is imaged by using the imaging unit 2 in FIG. 1, the imaging terminal 6 in FIG. 15 to be described later, and the like, the marker plate 10 is required to be imaged such that the image data includes not only the bead portion 1*a* but four or more of the center or the vertices Pkn of the pattern 10*a*.

A projective transformation parameter calculation method is performed as follows. First, the object coordinates (Xkn, Ykn) of all the vertices Pkn are primarily transformed by using an appropriate coefficient a and constants b and c, and coordinates (xkn', ykn') (in unit of [pix]) at which the vertices Pkn should be located in the image data after the projective transformation are determined. The primary transformation is performed based on Mathematical Expressions (3) and (4) below.

$$xkn' = aXkn + b \tag{3}$$

$$ykn' = aYkn + c \tag{4}$$

Here, the coefficient a corresponds to the reciprocal of the resolution r in the image data after the projective transformation. Therefore, a value of the coefficient a is preferably set as the reciprocal of r after the resolution r in the image data after the projective transformation is predetermined. Furthermore, the constants b and c are x and y coordinates of the origin of an object coordinate system in the image data after the projective transformation, respectively. Therefore, in the image data after projective transformation, values of the constants b and c are preferably set as b=x0 and c=y0 after the coordinates (x0, y0) of the origin of the object coordinates are predetermined.

For example, a case will be considered where the resolution r in the image data after the projective transformation is defined as 0.5 [mm/pix] and the position of the origin of the object coordinates in the image data after the projective transformation is (0 [pix], 100 [pix]). In this case, the coefficient a is required to be defined as a=1/r=1/0.5 [mm/pix]=2 [pix/mm], and the constants b and c are required to be defined as 0 [pix] and 100 [pix], respectively.

Subsequently, values of the parameters A, B, C, D, E, F, G, and H of the Mathematical Expressions (1) and (2) above are calculated. A value of each parameter is determined so that the image coordinates (xkn, ykn) of the vertices Pkn in the captured image data is transformed into the coordinates (xkn', ykn') at which the vertices Pkn should be located in the image data after the projective transformation by Mathematical Expressions (1) and (2) above.

There are several specific methods of calculating each parameter. For example, when exactly four vertices Pkn are provided, the above-mentioned values of the coordinates are substituted into Mathematical Expressions (1) and (2) above. The number of Expressions matches the number of unknowns. Then, the parameters A, B, C, D, E, F, G, and H are required to be determined by using the Expressions as simultaneous equations. Furthermore, when more than four vertices Pkn are provided, the values of the parameters A, B, C, D, E, F, G, and H are determined by using a known mathematical method such as a least squares method.

Note that a specific method of projective transformation is not limited to the method described here.

Next, in the image conversion step S24, the image data captured in the imaging step S1 is projectively transformed by using an estimated parameter M of projective transformation. The image data captured in the imaging step S1 is projectively transformed by using the estimated parameter M of projective transformation. Here, the parameter M of projective transformation refers to a combination of the parameters A, B, C, D, E, F, G, and H determined in the parameter estimation step S23. Furthermore, the image data after projective transformation is generated by replacing the coordinates (x, y) in the image data before the transformation with the coordinates (x', y') calculated by using Mathematical Expressions (1) and (2) above while maintaining the luminance value or the RGB value in the image data before the transformation.

Then, after the above-described processing of the image conversion step S24 is performed, the projective transformation step S2 is ended, and the processing proceeds to the subsequent calculation step S3.

Note that, in the misalignment measurement method according to the first embodiment, when the image data fails to be projectively transformed in the projective transformation step S2, the calculation step S3 is skipped, and the processing proceeds to the display step S4.

Figure 8:
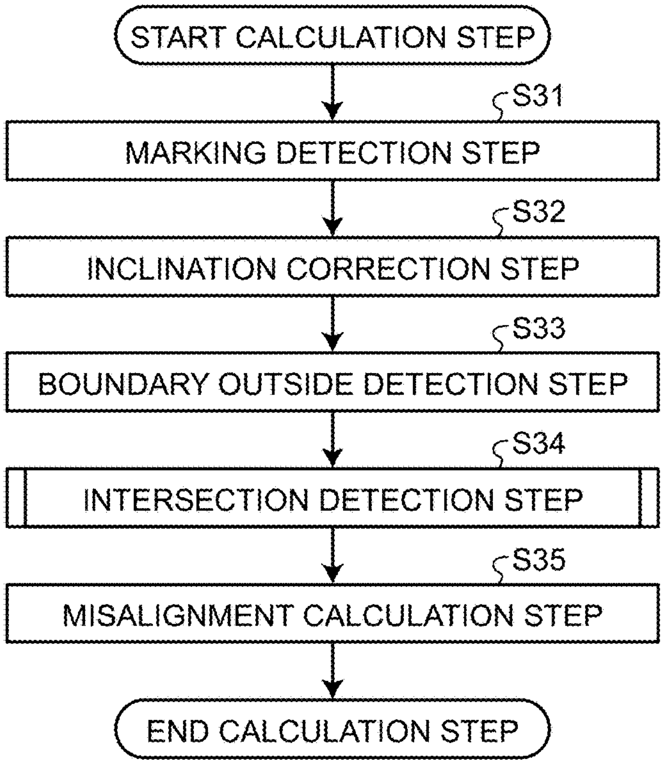
FIG. 8 is a flowchart illustrating details of a calculation step.

FIG. 8 is a flowchart illustrating details of the calculation step S3.

The calculation step S3 includes a marking detection step S31, an inclination correction step S32, a boundary outside detection step S33, an intersection detection step S34, and a misalignment calculation step S35. Then, in the calculation step S3, processing of each of the following steps is performed by using the image data after the projective transformation obtained in the projective transformation step S2.

When the calculation step S3 is started, first, the marking detection step S31 is performed. In the marking detection step S31, marking of the boundary 1*c* and the outer peripheral line 1*d* traced in the bead/base material boundary marking step S11 of the imaging step S1 is extracted. In marking detection, an appropriate method is required to be selected in accordance with characteristics of a writing instrument with which the boundary 1*c* and the outer peripheral line 1*d* are traced. For example, a case will be considered in which a color camera is used as the imaging unit 2 and a blue writing instrument is used (handwriting portion is blue). In this case, it is preferable to take a difference between a blue channel of the image data and a red channel which has a complementary color of blue and a portion having the difference larger than a predetermined threshold is extracted as marking. In contrast, when a monochrome camera is used as the imaging unit 2 and a writing instrument in which a handwriting portion does not transmit and reflect light at all is used, a region having a certain luminance value or less is preferably extracted from the periphery of the bead portion 1*a* in the image data as marking.

Furthermore, in any case, noise is removed by performing morphology processing after extracting a region through binarization and excluding a region having a certain area or less after performing labeling processing, which enables more accurate extraction of a marking region.

Next, when the above-described processing of the marking detection step S31 ends, the inclination correction step S32 is performed in the calculation step S3. In the inclination correction step S32, processing of correcting an inclination is performed by rotating the image data so that the x-axis direction of the image data becomes parallel to the outer surface 11 of the welded steel pipe 1. This processing is performed to remove a rotation error in a case where the bead portion 1*a* and the marker plate 10 are slightly rotated.

Figure 9:
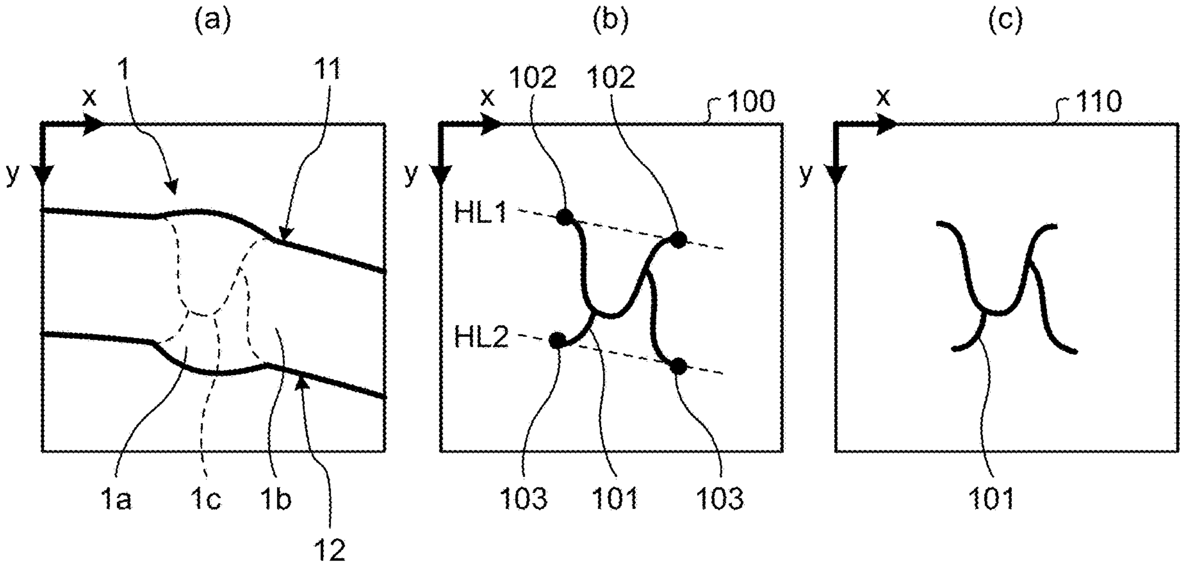
FIG. 9 illustrates processing performed in an inclination correction step.

FIG. 9 illustrates processing performed in the inclination correction step S32. Note that FIG. 9(*a*) illustrates image data of a cross section of the welded portion of the welded steel pipe 1 imaged by the imaging unit 2. Furthermore, FIG. 9(*b*) illustrates image data 100 obtained as a result of the processing of the marking detection step S31. Note that, reference signs 102 in FIG. 9(*b*) denote a point having a local minimum y-coordinate in an extracted marking region 101. Furthermore, reference signs 103 in FIG. 9(*b*) denote a point having a local maximum y-coordinate in an extracted marking region 101. Furthermore, a broken line HL1 in FIG. 9(*b*) is a straight line connecting the points 102. Furthermore, a chain line HL2 in FIG. 9(*b*) is a straight line connecting the points 103. Furthermore, FIG. 9(*c*) illustrates corrected image data after rotation correction obtained as a result of the processing of the inclination correction step S32. Note that a reference sign 101 in FIG. 9(*c*) denotes the marking region 101 extracted as marking drawn along the boundary 1*c* and the outer peripheral line 1*d*.

When the marking region 101 is correctly extracted, the broken line HL1 can be regarded as a straight line parallel to the outer surface 11 of the welded steel pipe 1 since the points 102 are intersections of the marking region 101 and the outer surface 11 of the welded steel pipe 1. Therefore, the x-axis direction of the image data can be parallel to the outer surface 11 of the welded steel pipe 1 by rotating the entire image data such that the broken line HL1 is parallel to the x-axis direction of the image data.

In contrast, when the outer surface 11 of the welded steel pipe 1 is substantially parallel to the inner surface 12 of the welded steel pipe 1 and the difference therebetween is negligible, the image data may be rotated such that the x-axis direction of the image data is parallel to the inner surface 12 of the welded steel pipe 1. Note that, the outer surface 11 of the welded steel pipe 1 being substantially parallel to the inner surface 12 of the welded steel pipe 1 can mean that a straight line LP2 is parallel to the outer surface 11. The straight line LP2 connects intersections CP5 and CP6 of the inner surface 12 of the welded steel pipe 1 and the boundaries 1*c*-LL and 1*c*-LR as illustrated in FIG. 2(*b*), for example.

Then, when the image data is rotated such that the x-axis direction of the image data is parallel to the inner surface 12 of the welded steel pipe 1 and the marking region 101 is correctly extracted, the points 103 are intersections of the marking region 101 and the inner surface 12 of the welded steel pipe 1. From this, the chain line HL2 can be regarded as a straight line parallel to the inner surface 12 of the welded steel pipe 1. Therefore, the x-axis direction of the image data can be parallel to the inner surface 12 of the welded steel pipe 1 by rotating the entire image data such that the chain line HL2 is parallel to the x-axis direction of the image data.

Next, when the above-described processing of the inclination correction step S32 ends, the boundary outside detection step S33 is performed in the calculation step S3. In the boundary outside detection step S33, a left edge and a right edge of the marking region 101 are extracted from marking of the boundary 1*c* and the outer peripheral line 1*d* extracted in the marking detection step S31. This is processing necessary for detecting the intersections CP1 and CP2 of the boundary 1*c* and the outer peripheral line 1*d*.

Figure 10:
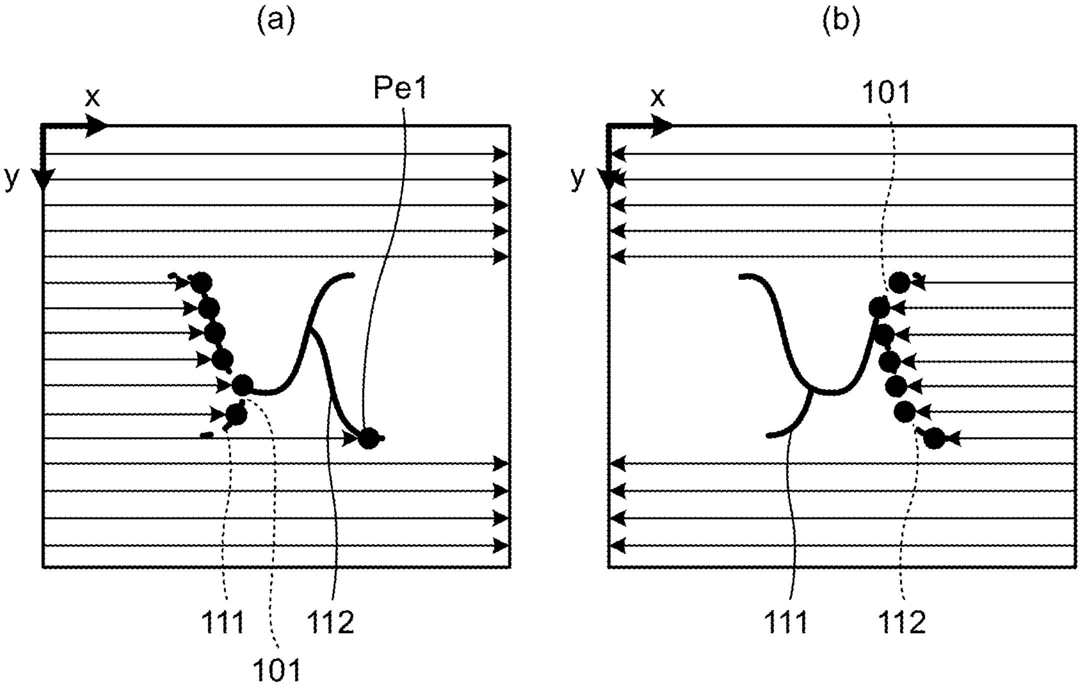
FIG. 10(*a*) illustrates a method of detecting a left edge of a marking region.

FIG. 10 illustrates processing performed in the boundary outside detection step S33. Note that a reference sign 111 in FIG. 10 denotes the left edge of the marking region detected in the boundary outside detection step S33. Furthermore, a reference sign 112 in FIG. 10 denotes the right edge of the marking region detected in the boundary outside detection step S33.

In the boundary outside detection step S33, corrected image data 110 obtained in the inclination correction step S32 is scanned along the x-axis direction for each y-coordinate, and coordinates of a position first intersecting the marking region 101 are detected. This causes each of the left edge 111 of the marking region 101 and the right edge 112 of the marking region 101 to be detected in the boundary outside detection step S33.

FIG. 10(*a*) illustrates a method of detecting the left edge 111 of the marking region 101. Scanning is performed in the x-axis direction from the left end toward the right end of the image data for values y of all possible y-coordinates in the image coordinates, and coordinates (xL_y, y) of a point first intersecting the marking region 101 are determined. Here, when the right end of the image data is reached without any intersection with the marking region 101 during the scanning in the x-axis direction, it is determined that there is no left edge 111 of the marking region in the y-coordinates. A special value (e.g., −1) that means no edge is then set to xL_y. A series of coordinates (xL_y, y) (y=1, . . . , and Y) obtained by the above-described procedure is a point group of coordinates along the left edge 111 of the marking region 101.

FIG. 10(*b*) illustrates a method of detecting the right edge 112 of the marking region 101. Scanning is performed in the x-axis direction from the right end toward the left end of the image data for values y of all possible y-coordinates in the image coordinates, and coordinates (xR_y, y) of a point first intersecting the marking region 101 are determined. Here, when the left end of the image data is reached without any intersection with the marking region 101 during the scanning in the x-axis direction, it is determined that there is no right edge 112 of the marking region 101 in the y-coordinates. A special value (e.g., −1) that means no edge is then set to xR_y. A series of coordinates (xR_y, y) (y=1, . . . , and Y) obtained by the above-described procedure is a point group of coordinates along the right edge 112 of the marking region 101.

Note that, in the above-described method, there may be erroneous detection in which a point detected as a point on the left edge 111 of the marking region 101 is actually a point included in the right edge 112 of the marking region 101. Conversely, there may be erroneous detection in which a point detected as a point on the right edge 112 of the marking region 101 is actually a point included in the left edge 111 of the marking region 101. For example, although a point Pe1 in FIG. 10(*a*) has been detected as a point on the left edge 111 of the marking region, the point Pe1 is actually included in the right edge 112 of the marking region 101.

In the intersection detection step S34 to be described later, for example, the rightmost point among points on the left edge 111 of the marking region 101 is processed as an intersection candidate. Such apparent erroneous detection is thus preferably excluded. A plurality of methods of excluding erroneous detection is conceivable. For example, focusing on the fact that such erroneous detection occurs at an upper end or a lower end of the marking region 101, a method is conceivable in which a special value (e.g., −1) is forcibly set to xR_y and xL_y and no detection is determined to be performed. Here, xR_y and xL_y are x-coordinates in a point group of coordinates near the upper end and the lower end.

For example, when the point group of coordinates (xL_y, y) (y=1, . . . , and Y) along the left edge 111 of the marking region 101 is obtained, y is changed from 1 to Y in ascending order. A y-coordinate first having a value of xL_y other than −1 is set as y0. In this case, the value of xL_y to y=y0, y0+1, . . . , and y0+dy (dy is predetermined positive number) is forcibly set as −1. The processing can exclude a coordinate detected near the upper end of the marking region 101 in the point group (xL_y, y) along the left edge 111 of the marking region 101, and exclude the erroneous detection.

Similarly, when the point group of coordinates (xL_y, y) (y=1, . . . , and Y) along the left edge 111 of the marking region 101 is obtained, y is changed from Y to 1 in descending order. A y-coordinate first having a value of xL_y other than −1 is set as y1. In this case, the value of xL_y to y=y1, y1-1, . . . , and y1-dy (dy is predetermined positive number) is forcibly set as −1. The processing can exclude a coordinate detected near the lower end of the marking region 101 in the point group (xL_y, y) along the left edge 111 of the marking region 101, and exclude the erroneous detection.

Note that similar processing is performed on a point group of coordinates (xR_y, y) (y=1, . . . , and Y) along the right edge 112 of the marking region 101. This can exclude a coordinate detected near the upper end and lower end of the marking region 101 in the point group (xR_y, y) along the right edge 112 of the marking region 101, and exclude the erroneous detection.

Of course, a method of detecting erroneous detection is not limited to that described above.

Figure 11:
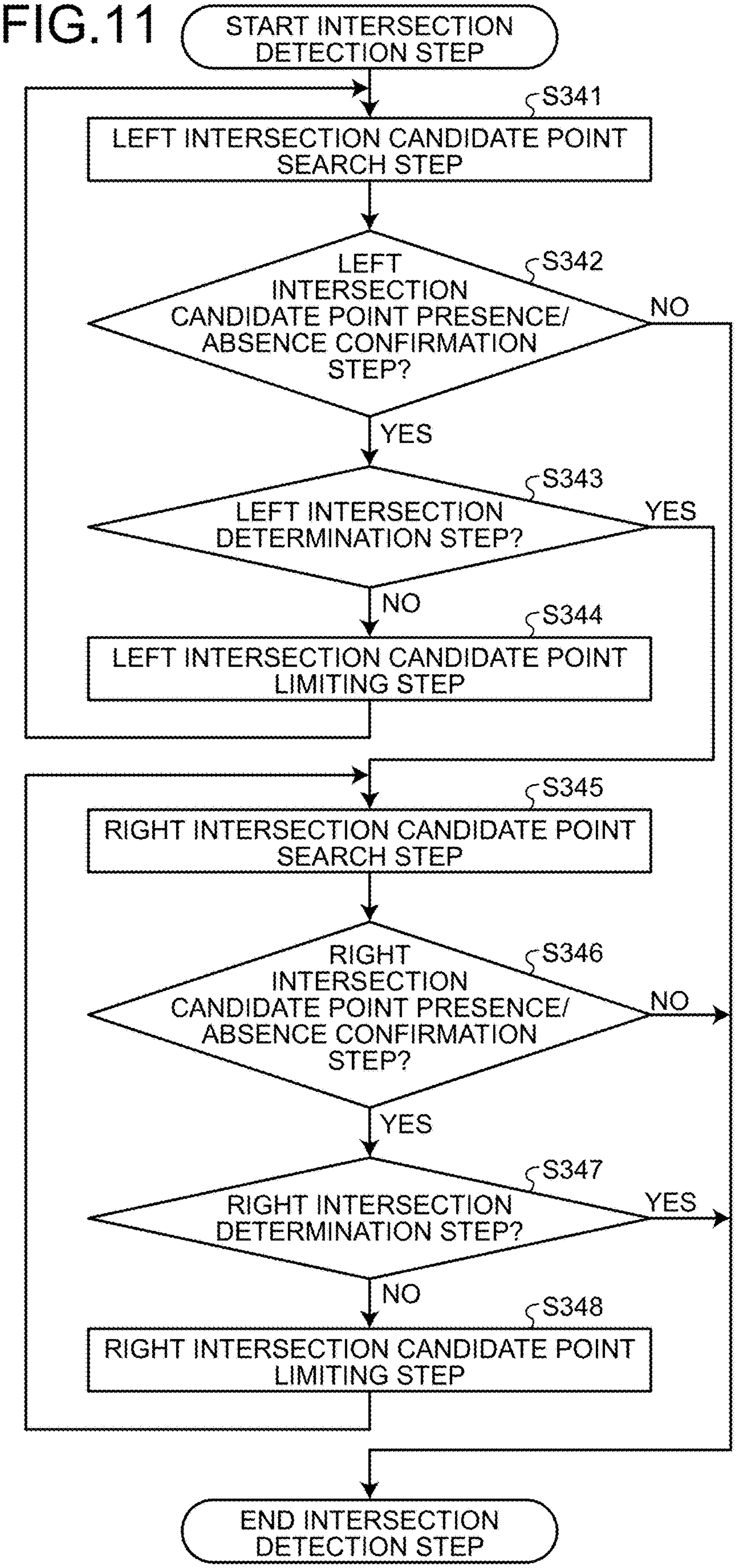
FIG. 11 is a flowchart illustrating details of an intersection detection step.

Next, when the above-described processing of the inclination correction step S32 ends, the intersection detection step S34 is performed in the calculation step S3. In the intersection detection step S34, the intersections CP1 and CP2 of the boundary 1*c* are detected. FIG. 11 is a flowchart illustrating details of the intersection detection step S34.

The intersection detection step S34 includes a left intersection candidate point search step S341, a left intersection candidate point presence/absence confirmation step S342, a left intersection determination step S343, a left intersection candidate point limiting step S344, a right intersection candidate point search step S345, a right intersection candidate point presence/absence confirmation step S346, a right intersection determination step S347, and a right intersection candidate point limiting step S348.

Then, when the intersection detection step S34 is started, first, the left intersection candidate point search step S341 is performed. In the left intersection candidate point search step S341, an intersection candidate point is searched for from the left edge 111 of the marking region 101. Here, a point having the largest value, that is, a point located on the rightmost side is selected from points having the x-coordinate xL_y other than −1 in the point group (xL_y, y) along the left edge 111 of the marking region 101, and set as a candidate point of the left intersection CP1. If all the x-coordinates of the point group (xL_y, y) are −1, it is determined that there is not a candidate point.

Next, in the intersection detection step S34, the left intersection candidate point presence/absence confirmation step S342 is performed. In the left intersection candidate point presence/absence confirmation step S342, whether or not a candidate point of the left intersection CP1 has been found is determined. That is, in the left intersection candidate point presence/absence confirmation step S342, when the candidate point of the left intersection CP1 is found in the left intersection candidate point search step S341, it is determined that there is the candidate point of the left intersection CP1 (Yes in left intersection candidate point presence/absence confirmation step S342), and the processing proceeds to the next left intersection determination step S343. In contrast, in the left intersection candidate point presence/absence confirmation step S342, when the candidate point of the left intersection CP1 is not found in the left intersection candidate point search step S341, it is determined that there is not the candidate point of the left intersection CP1 (No in left intersection candidate point presence/absence confirmation step S342), and the processing of the intersection detection step S34 is ended as an error.

Figure 12:
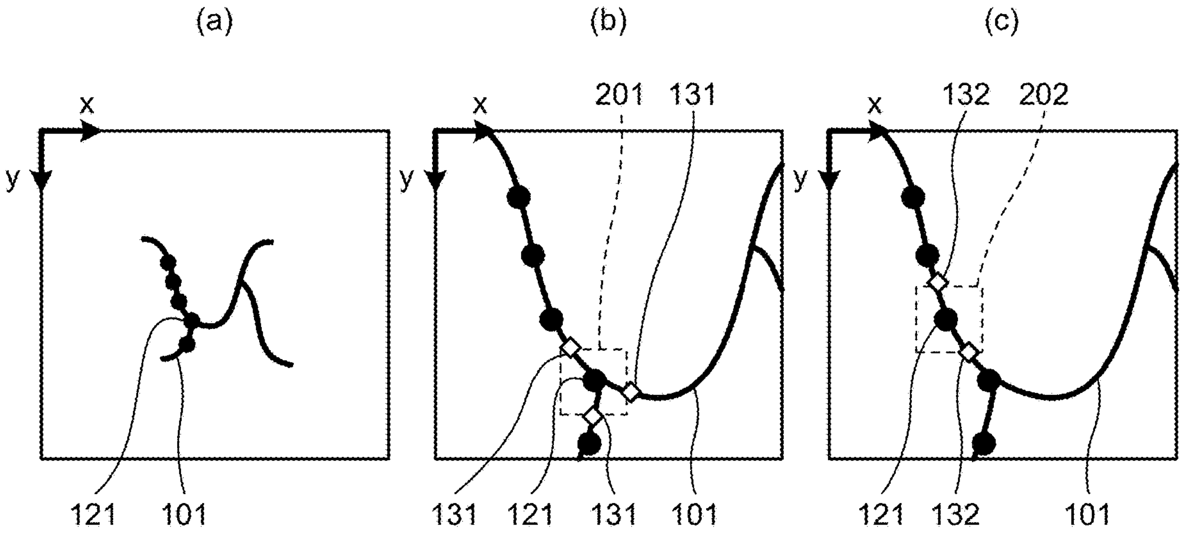
FIG. 12 illustrates a method of determining whether or not a found candidate point is a left intersection.

In the left intersection determination step S343, whether or not the found candidate point is the left intersection CP1 is determined. FIG. 12 illustrates a method of determining whether or not the found candidate point is the left intersection CP1. Note that a reference sign 121 in FIG. 12(*a*) denotes the candidate point of the left intersection CP1. Furthermore, as indicated by broken lines in FIGS. 12(*b*) and 12(*c*), focusing on rectangles 201 and 202 having a predetermined size around the candidate point 121, the number of points 131 and 132 (points indicated by white rhombuses in FIGS. 12(*b*) and 12(*c*)) where the rectangles 201 and 202 intersect the marking region 101 is counted.

As illustrated in FIG. 12(*b*), when the candidate point 121 is the left intersection CP1, there are three points 131 where the rectangle 201 intersects the marking region 101. In this case, it is determined that the current candidate point 121 is the left intersection CP1 (Yes in left intersection determination step S343), and the processing proceeds to the right intersection candidate point search step S345.

In contrast, as illustrated in FIG. 12(*c*), when the candidate point 121 is not an intersection, there are two points 132 where the rectangle 202 intersects the marking region 101. In this case, it is determined that the current candidate point 121 is not the left intersection CP1 (No in left intersection determination step S343), and the processing proceeds to the left intersection candidate point limiting step S344.

In the left intersection candidate point limiting step S344, when it is determined that the candidate point 121 is not the left intersection CP1, preprocessing for searching for a new candidate point 121 is performed. At the stage of reaching this step, it has been confirmed that the point selected as the candidate point 121 of the left intersection CP1 is actually not the left intersection CP1. Re-search is thus required to be performed excluding the point.

Therefore, in the left intersection candidate point limiting step S344, the x-coordinates xL_y of the current candidate point 121 and a point near the current candidate point 121 in the point group (xL_y, y) along the left edge 111 of the marking region 101 are overwritten with −1, and the processing returns to the left intersection candidate point search step S341. Then, in the left intersection candidate point search step S341, a point having the largest value among points having the x-coordinate xL_y other than −1 is set as the candidate point 121. A point once determined not to be the left intersection CP1 in the above-described processing is not selected as the candidate point 121 thereafter.

In the right intersection candidate point search step S345, an intersection candidate point is searched for from the right edge 112 of the marking region 101. Here, a point having the smallest value, that is, a point located on the rightmost side is selected from points having the x-coordinate xR_y other than −1 in the point group (xR_y, y) along the right edge 112 of the marking region 101, and set as a candidate point of the right intersection CP2. If all the x-coordinates of the point group (xR_y, y) are −1, it is determined that there is not a candidate point.

Next, after the above-described processing of the right intersection candidate point search step S345 ends, whether or not the candidate point of the right intersection CP2 has been found is determined in the right intersection candidate point presence/absence confirmation step S346. That is, in the right intersection candidate point presence/absence confirmation step S346, when the candidate point of the right intersection CP2 is found in the right intersection candidate point search step S345, it is determined that there is the candidate point of the right intersection CP2 (Yes in right intersection candidate point presence/absence confirmation step S346), and the processing proceeds to the next right intersection determination step S347. In contrast, in the right intersection candidate point presence/absence confirmation step S346, when the candidate point of the right intersection CP2 is not found in the right intersection candidate point search step S345, it is determined that there is not the candidate point of the right intersection CP2 (No in right intersection candidate point presence/absence confirmation step S346), and the processing of the intersection detection step S34 is ended as an error.

Figure 13:
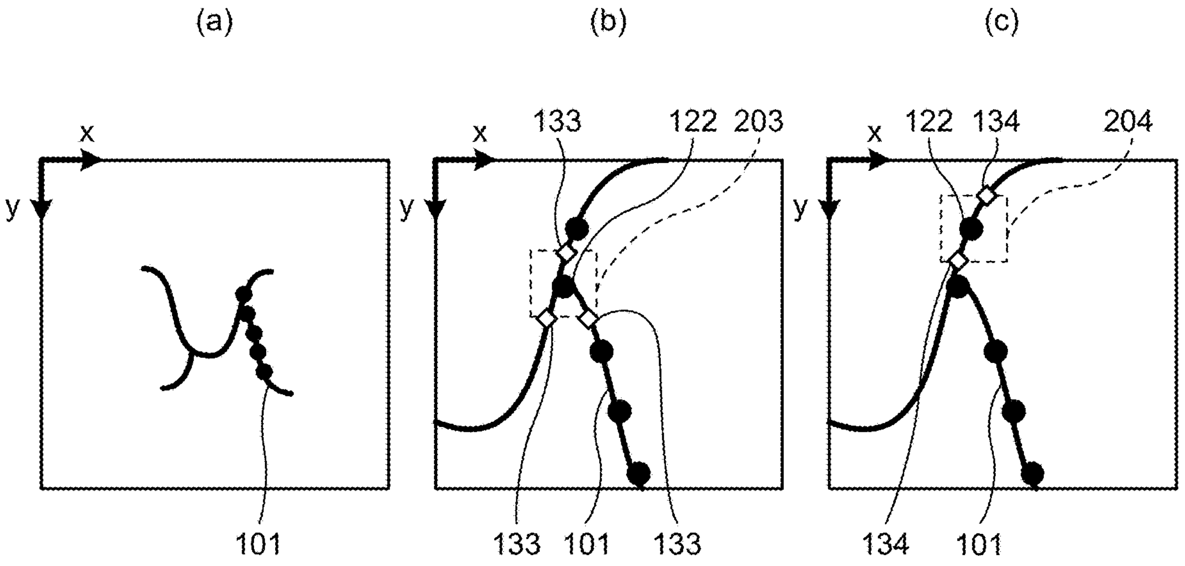
FIG. 13 illustrates a method of determining whether or not a found candidate point is a right intersection.

Next, in the right intersection determination step S347, whether or not the found candidate point is the right intersection CP2 is determined. FIG. 13 illustrates a method of determining whether or not the found candidate point is the right intersection CP2. Note that a reference sign 122 in FIG. 13(*a*) denotes the candidate point of the right intersection CP2. Furthermore, as indicated by broken lines in FIGS. 13(*b*) and 13(*c*), focusing on rectangles 203 and 204 having a predetermined size around the candidate point 122, the number of points 133 and 134 (points indicated by white rhombuses in FIGS. 13(*b*) and 13(*c*)) where the rectangles 203 and 204 intersect the marking region 101 is counted.

As illustrated in FIG. 13(*b*), when the candidate point 122 is the right intersection CP2, there are three points 133 where the rectangle 203 intersects the marking region 101. In this case, it is determined that the current candidate point 122 is the right intersection CP2 (Yes in right intersection determination step S347), and the processing of the intersection detection step S34 is ended.

In contrast, as illustrated in FIG. 13(*c*), when the candidate point 122 is not an intersection, there are two points 134 where the rectangle 204 intersects the marking region 101. In this case, it is determined that the current candidate point 122 is not the right intersection CP2 (No in right intersection determination step S347), and the processing proceeds to the right intersection candidate point limiting step S348.

In the right intersection candidate point limiting step S348, when it is determined that the candidate point 122 is not the right intersection CP2, preprocessing for searching for a new candidate point 122 is performed. At the stage of reaching this step, it has been confirmed that the point selected as the candidate point 122 of the right intersection CP2 is actually not the right intersection CP2. Re-search is thus required to be performed excluding the point.

Therefore, in the right intersection candidate point limiting step S348, the x-coordinates xR_y of the current candidate point 122 and a point near the current candidate point 122 in the point group (xR_y, y) along the right edge 112 of the marking region 101 are overwritten with −1, and the processing returns to the right intersection candidate point search step S345. In the right intersection candidate point search step S345, a point having the smallest value among points having the x-coordinate xR_y other than −1 is set as the candidate point. A point once determined not to be the right intersection CP2 in the above-described processing is not selected as the candidate point 122 thereafter.

Figure 14:
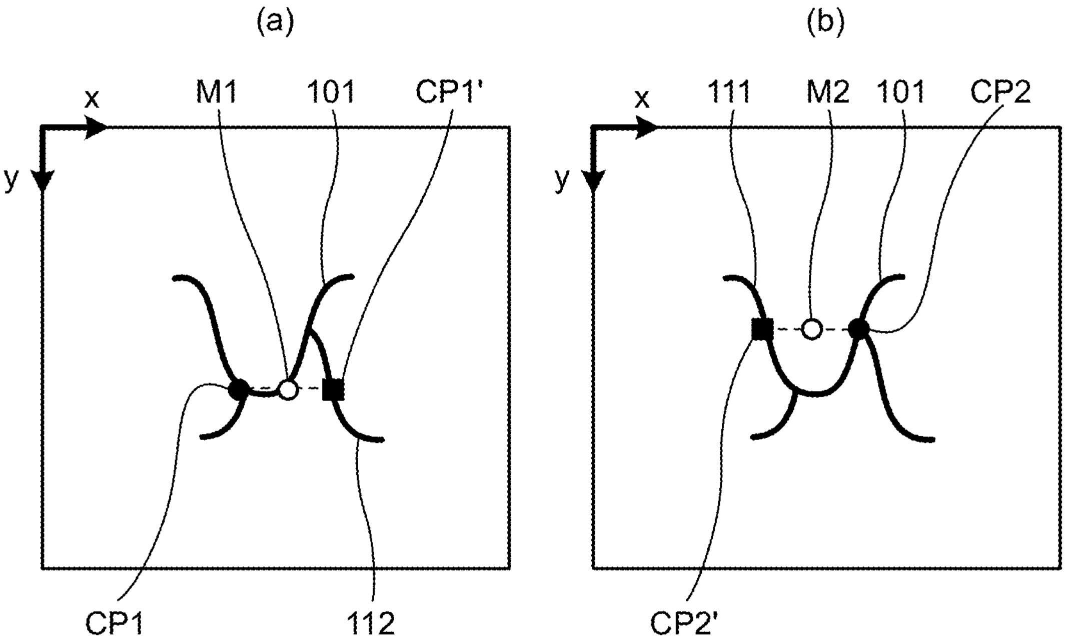
FIG. 14(*a*) illustrates processing performed on a left intersection.

Next, after the above-described processing of the intersection detection step S34 is performed, the misalignment calculation step S35 is performed in the calculation step S3. In the misalignment calculation step S35, a misalignment amount is calculated from the detected left intersection CP1 and right intersection CP2. FIG. 14 illustrates processing of the misalignment calculation step S35.

FIG. 14(*a*) illustrates processing performed on the left intersection CP1. As illustrated in FIG. 14(*a*), scanning is performed in the right direction along the x-axis direction of the image data starting from the detected left intersection CP1. An intersection with the right edge 112 of the marking region 101 is set as the intersection CP1'. The processing is performed by selecting the x-coordinate xR_y having the same y-coordinate as the left intersection CP1 from the point group (xR_y, y) along the right edge 112 of the marking region 101. Next, the x-coordinate in the image data of the midpoint M1 of the left intersection CP1 and the corresponding intersection CP1' is calculated. Specifically, an x-coordinate xM1 of the midpoint M1 of an x-coordinate xCP1 in the image data of the left intersection CP1 and an x-coordinate xCP1' in the image data of the intersection CP1' is calculated by Mathematical Expression (5) below.

$$xM1=(xCP1+xCP1')/2 \tag{5}$$

FIG. 14(*b*) illustrates processing performed on the right intersection CP2. As illustrated in FIG. 14(*b*), scanning is performed in the left direction along the x-axis direction of the image data starting from the detected right intersection CP2. An intersection with the left edge 111 of the marking region 101 is set as the intersection CP2'. The processing is performed by selecting the x-coordinate xL_y having the same y-coordinate as the right intersection CP2 from the point group (xL_y, y) along the left edge 111 of the marking region 101. Next, the x-coordinate in the image data of the midpoint M2 of the right intersection CP2 and the corresponding intersection CP2' is calculated. Specifically, an x-coordinate xM2 of the midpoint M2 of an x-coordinate xCP2 in the image data of the right intersection CP2 and an x-coordinate xCP2' in the image data of the intersection CP2' is calculated by Mathematical Expression (6) below.

$$xM2=(xCP2+xCP2')/2 \tag{6}$$

Finally, the misalignment amount d is calculated by Mathematical Expression (7) below. Note that r in Mathematical Expression (7) below denotes a resolution (unit [mm/pix]) of the image data.

$$d=r(xM2-xM1) \tag{7}$$

Next, in the misalignment measurement method according to the first embodiment, after the above-described processing of the misalignment calculation step S35 is performed, the calculation step S3 is ended, and the processing proceeds to the subsequent display step S4. In the display step S4, information including the calculated misalignment amount d is displayed on the display device 4. Here, examples of the displayed information includes information of the misalignment amount d, information serving as a basis of calculation of the misalignment amount d, image data before projective transformation, image data after projective transformation, intermediate image data generated in a process of processing, image data on which a result of the calculation of the misalignment amount d is superimposed, and image data on which information serving as a basis of calculation of the misalignment amount d is superimposed. In particular, an operator can intuitively interpret a basis of calculation of the misalignment amount d by displaying image data on which a result of calculation of the misalignment amount d and information serving as calculation are superimposed with an auxiliary line and the like.

Furthermore, the operator may change an imaging condition of image data, in which the marker plate 10 and the bead portion 1*a* in the cross section of the welded portion where the marker plate 10 is provided are imaged, based on the obtained information including the misalignment amount d. In particular, when the above-described imaging step S1 is executed, the imaging condition in the imaging step S1 can be changed.

Second Embodiment

A second embodiment of the misalignment measurement system, the welded steel pipe manufacturing facility, the misalignment measurement method, the welded steel pipe manufacturing method, and the welded steel pipe quality control method according to the present invention will be described below. Note that, in the second embodiment, description similar to that of the first embodiment will be appropriately omitted.

Figure 15:
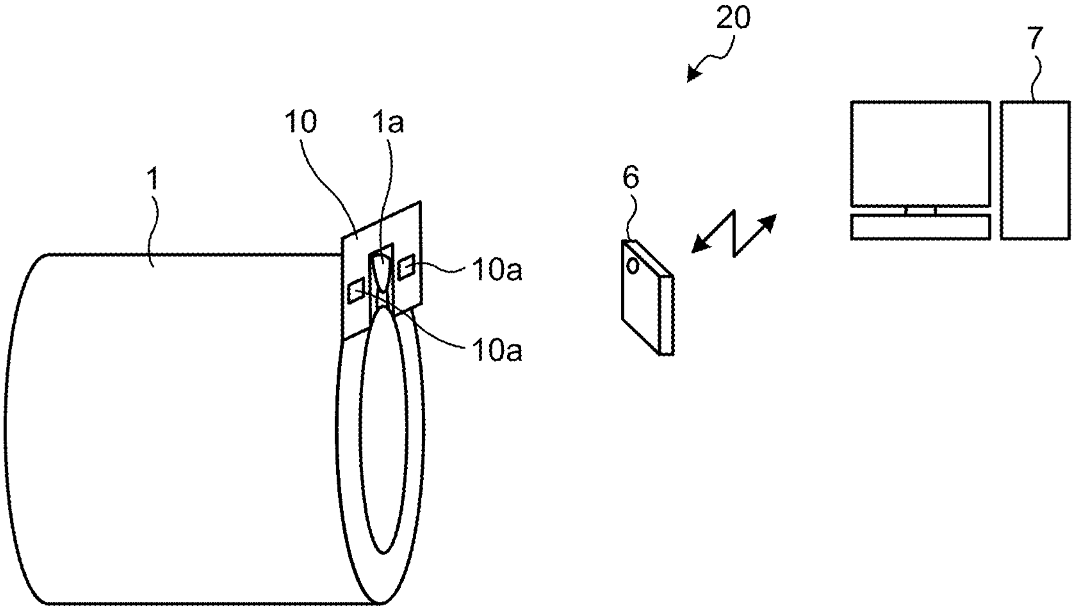
FIG. 15 illustrates one example of a misalignment measurement system according to a second embodiment.
Figure 16:
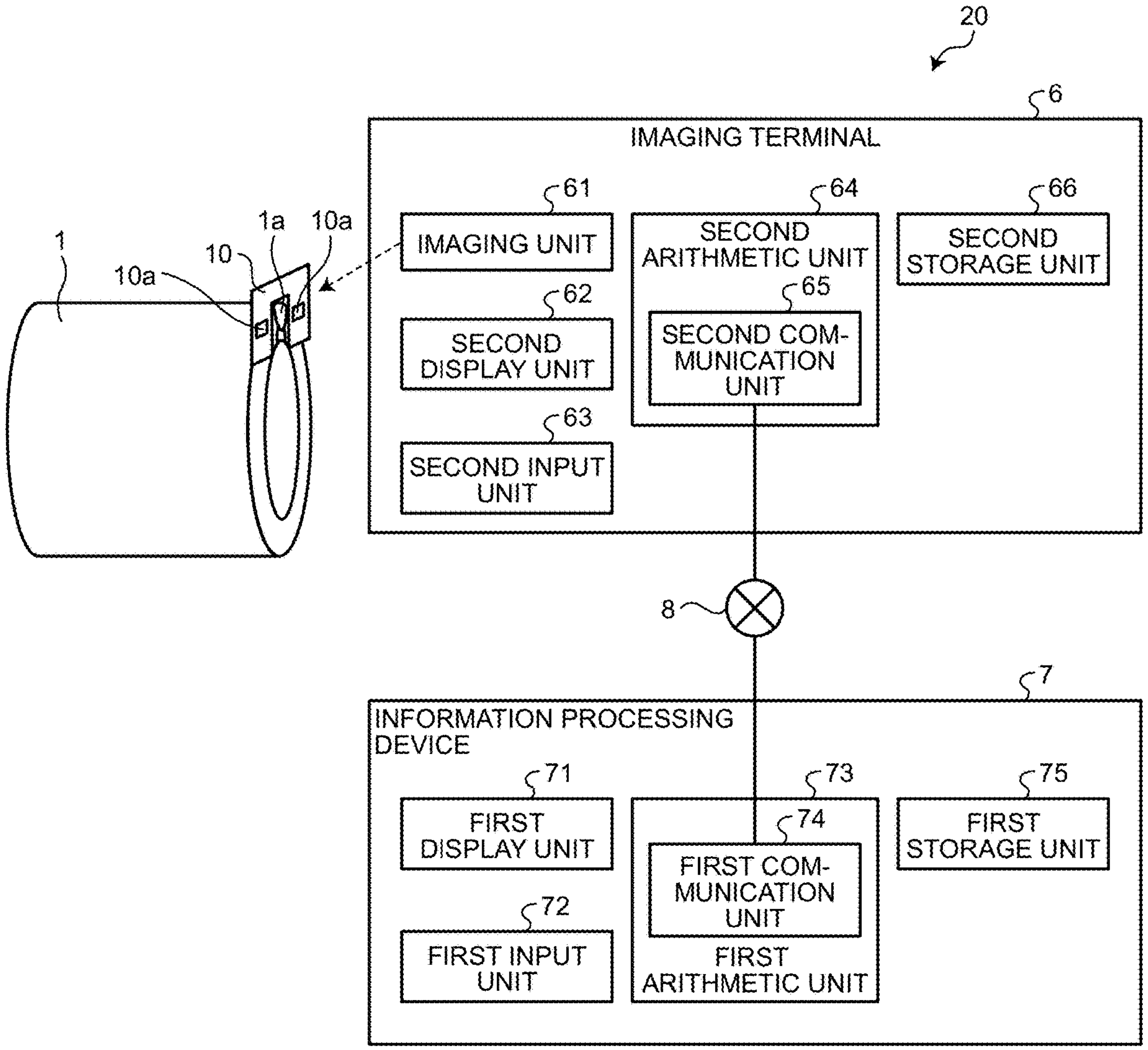
FIG. 16 illustrates a main part configuration of the misalignment measurement system according to the second embodiment.

FIG. 15 illustrates one example of a misalignment measurement system 20 according to the second embodiment. FIG. 16 illustrates a main part configuration of the misalignment measurement system 20 according to the second embodiment.

The misalignment measurement system 20 according to the second embodiment includes an imaging terminal 6, an information processing device 7, a repeater 8, and a marker plate 10.

In the misalignment measurement system 20 according to the second embodiment, the imaging terminal 6 is, for example, a computer including an imaging unit 61, a second display unit 62, a second input unit 63, a second arithmetic unit 64, a second communication unit 65, and a second storage unit 66.

Specifically, the imaging terminal 6 is a smartphone, a tablet terminal, a digital camera with a communication function, or the like. In the embodiment, a case where the smartphone is used as the imaging terminal 6 will be described. Here, the imaging unit 61 includes a camera built in the smartphone. The second display unit 62 includes a display built in the smartphone. The second input unit 63 includes a touch panel built in the smartphone. The second arithmetic unit 64 includes a CPU and a GPU built in the smartphone. The second communication unit 65 is provided in the second arithmetic unit 64, and includes a communication interface built in the smartphone. The second storage unit 66 includes a memory built in the smartphone.

The imaging unit 61, the second display unit 62, the second arithmetic unit 64, and the second storage unit 66 of the imaging terminal 6 have functions equivalent to those of the imaging unit 2, the arithmetic device 3, the display device 4, and the storage device 5 of the misalignment measurement system 20 according to the first embodiment. Note that, since the imaging terminal 6 includes the imaging unit 61, a virtual device (e.g., cloud) on a network cannot be set. Furthermore, the imaging terminal 6 constitutes an imaging system for measuring misalignment of a bead portion 1*a* of a cross section in a welded portion of a welded steel pipe 1 together with the marker plate 10.

In the misalignment measurement system 20 according to the second embodiment, the information processing device 7 is, for example, a computer. The computer is, for example, an integrated personal computer including a first display unit 71, a first input unit 72, a first arithmetic unit 73, a first communication unit 74, and a first storage unit 75.

The first display unit 71 includes a monitor. The first input unit 72 includes a keyboard, a mouse, and a microphone. The first arithmetic unit 73 includes a CPU and a GPU, and also includes the first communication unit 74. The first communication unit 74 is provided in the first arithmetic unit 73, and includes a communication interface. The first storage unit 75 includes a hard disk and a solid-state drive. Note that a virtual device (e.g., cloud) on a network may be used as the information processing device 7.

In the misalignment measurement system 20 according to the second embodiment, the second communication unit 65 and the first communication unit 74 respectively provided in the imaging terminal 6 and the information processing device 7 enable the imaging terminal 6 and the information processing device 7 to wirelessly communicate with each other via the repeater 8, which is a communication device having a wireless communication function. Note that the second communication unit 65 and the first communication unit 74 may enable the imaging terminal 6 and the information processing device 7 to directly communicate with each other by short-range wireless communication such as Bluetooth (registered trademark) without the repeater 8.

In the misalignment measurement system 20 according to the second embodiment, the imaging terminal 6 and the information processing device 7 are not limited to being in the same facility at the time when misalignment is measured. For example, the imaging terminal 6 and the information processing device 7 may be in different facilities of a host company. Furthermore, the imaging terminal 6 may be in a facility of the host company, and the information processing device 7 may be in a facility of another company. Furthermore, the imaging terminal 6 may be in the facility of the other company, and the information processing device 7 may be in the facility of the host company. That is, positions of the imaging terminal 6 and the information processing device 7 at the time when misalignment is measured are not particularly limited as long as the imaging terminal 6 and the information processing device 7 can wirelessly communicate with each other via the repeater 8.

In the misalignment measurement system 20 according to the second embodiment, not only the second storage unit 66 of the imaging terminal 6 but the first storage unit 75 of the information processing device 7 may store image data captured by the imaging unit 61, information on the calculated misalignment amount, and the like. That is, the imaging terminal 6 may transmit information to be recorded such as the information including a misalignment amount from the second communication unit 65 to the first communication unit 74 of the information processing device 7 via the repeater 8, and cause the first storage unit 75 having a larger capacity of storage area than the second storage unit 66 to record the information.

Note that the information to be recorded, transmitted from the imaging terminal 6 to the information processing device 7, includes image data captured by the imaging unit 61. Furthermore, the information to be recorded includes parameters at the time of processing in the imaging terminal 6. Examples of the parameters include a type, a position, an angle, a size, and an identifier, which are information on the pattern 10*a* arranged on the marker plate 10. Moreover, the parameters include color and thickness of a writing instrument used in the bead/base material boundary marking step, a resolution in the projective transformation step, a threshold of handwriting extraction in the calculation step, and an initial value necessary for another piece of processing. It is preferable that these parameters of processing can be designated by the operator operating the second input unit 63 of the imaging terminal 6.

Furthermore, the information to be recorded includes a processing result in the imaging terminal 6. The processing result includes, for example, image data obtained by adding a value of a misalignment amount and an auxiliary line serving as a basis of calculation of the misalignment amount to image data captured by the imaging unit 61 or image data obtained by projectively transforming the image data. Moreover, the information to be recorded includes, for example, text data of the value of the misalignment amount, text data of coordinate information of the auxiliary line serving as a basis of calculation of the misalignment amount, and text data on parameters of projective transformation.

Furthermore, the information to be recorded includes basic information such as information on the date, time, and place of imaging, a person who performs imaging, and the imaging terminal 6 and information on the welded steel pipe 1. The information on the imaging terminal 6 includes, for example, information on an identifier and an IP address of the imaging terminal 6. The information on the welded steel pipe 1 includes, for example, information for identifying the welded steel pipe 1, such as a product number, a product name, a lot number, and a standard, and information characterizing the welded steel pipe 1. Note that, for example, the operator inputs the information on the welded steel pipe 1 by using the second input unit 63 of the imaging terminal 6.

Figure 17:
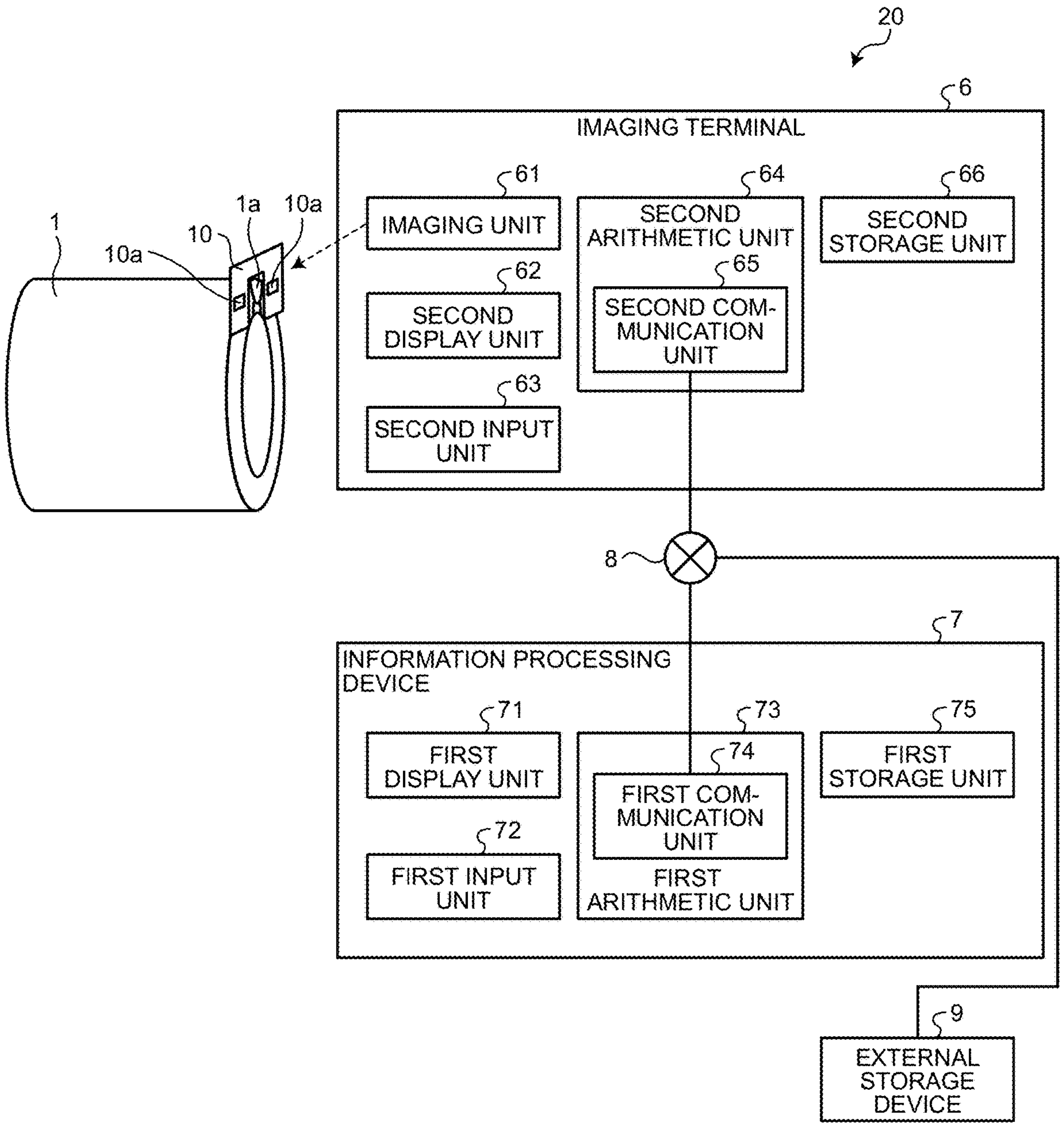
FIG. 17 illustrates another example of the misalignment measurement system according to the second embodiment.

Furthermore, as illustrated in FIG. 17, the misalignment measurement system 20 according to the second embodiment may include an external storage device 9 separately from the imaging terminal 6 and the information processing device 7. The external storage device 9 is a data recording instrument using a large-scale database. The external storage device 9 is provided in a facility different from a facility in which the imaging terminal 6 and the information processing device 7 are provided. Then, in the misalignment measurement system 20 according to the second embodiment, for example, the information to be recorded and the like may be recorded in the external storage device 9. Note that a virtual device (e.g., cloud) on a network may be used as the external storage device 9.

Figure 18:
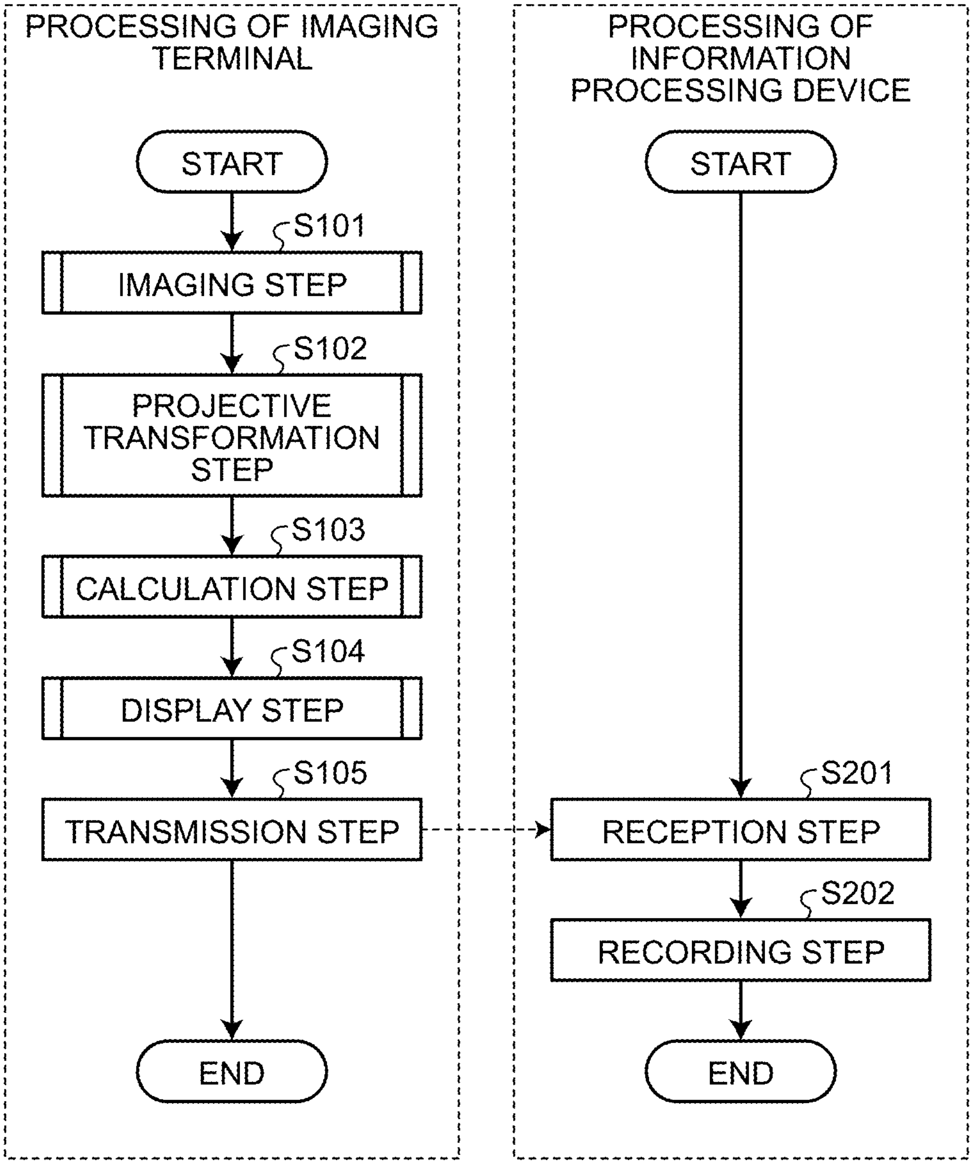
FIG. 18 is a flowchart illustrating one example of processing of an imaging terminal and processing of an information processing device performed by the misalignment measurement system according to the second embodiment.

FIG. 18 is a flowchart illustrating one example of processing of the imaging terminal 6 and processing of the information processing device 7 performed by the misalignment measurement system 20 according to the second embodiment. Note that an imaging step S101, a projective transformation step S102, a calculation step S103, and a display step S104 in FIG. 18 are similar to the imaging step S1, the projective transformation step S2, the calculation step S3, and the display step S4 in FIG. 3.

In the misalignment measurement system 20 according to the second embodiment, first, the bead portion 1*a* and the marker plate 10 in the cross section of the welded portion of the welded steel pipe 1 to be measured are imaged by the imaging unit 61 of the imaging terminal 6 (imaging step S101). Next, the imaging terminal 6 causes the second arithmetic unit 64 to projectively transform the captured image data (projective transformation step S102). Next, the imaging terminal 6 causes the second arithmetic unit 64 to perform image processing for calculating a misalignment amount by using the image data after the projective transformation and calculate the misalignment amount (calculation step S103). Next, the imaging terminal 6 causes the second display unit 62 to display information of the calculated misalignment amount and the like (display step S104). Thereafter, the imaging terminal 6 causes the second communication unit 65 to transmit information to be recorded such as the information on the calculated misalignment amount to the first communication unit 74 of the information processing device 7 via the repeater 8 (step S105).

Next, the information processing device 7 causes the first communication unit 74 to receive the information to be recorded from the second communication unit 65 of the imaging terminal 6 via the repeater 8. Thereafter, the information processing device 7 causes the first storage unit 75 to record the information to be recorded (recording step S202).

The misalignment measurement system 20 according to the second embodiment can be operated not only as a simple measurement system but as a measurement support system for an operator in a field by using the imaging terminal 6. For example, introducing the imaging terminal 6 with high portability and image conversion processing using the marker plate 10 enables the operator to measure misalignment for the welded portion of the welded steel pipe 1 to be measured from a free position. Furthermore, in consideration of the recent spread of smartphones, tablet terminals, and the like, a misalignment amount can be automatically measured by simplifying a user interface without performing special training for measuring misalignment for the operator. Furthermore, in the imaging terminal 6, displaying a processing result and the like on the second display unit 62 in real time enables the operator to search for the direction of the imaging unit 61 suitable for imaging the cross section of the welded portion of the welded steel pipe 1 and perform imaging by using the imaging unit 61 under an optimal condition, which leads to a more preferred state.

In the misalignment measurement system 20 according to the second embodiment, when the imaging terminal 6 measures misalignment, the operator can change an imaging condition of image data in which the bead portion 1*a* in the cross section of the welded portion provided with the marker plate 10 is imaged together with the marker plate 10 based on the displayed information including the misalignment amount d, and use the condition as a clue to search for an optimal imaging position. Thus, the misalignment measurement system 20 is useful as the measurement support system for a field operator. In particular, using the imaging terminal 6 including the second display unit 62 enhances the above-described usefulness. In this case, when the above-described imaging step S101 is executed, the imaging condition in the imaging step S101 can be changed.

Third Embodiment

A third embodiment of the misalignment measurement system, the welded steel pipe manufacturing facility, the misalignment measurement method, the welded steel pipe manufacturing method, and the welded steel pipe quality control method according to the present invention will be described below. Note that, in the third embodiment, description similar to that of the second embodiment will be appropriately omitted.

Figure 19:
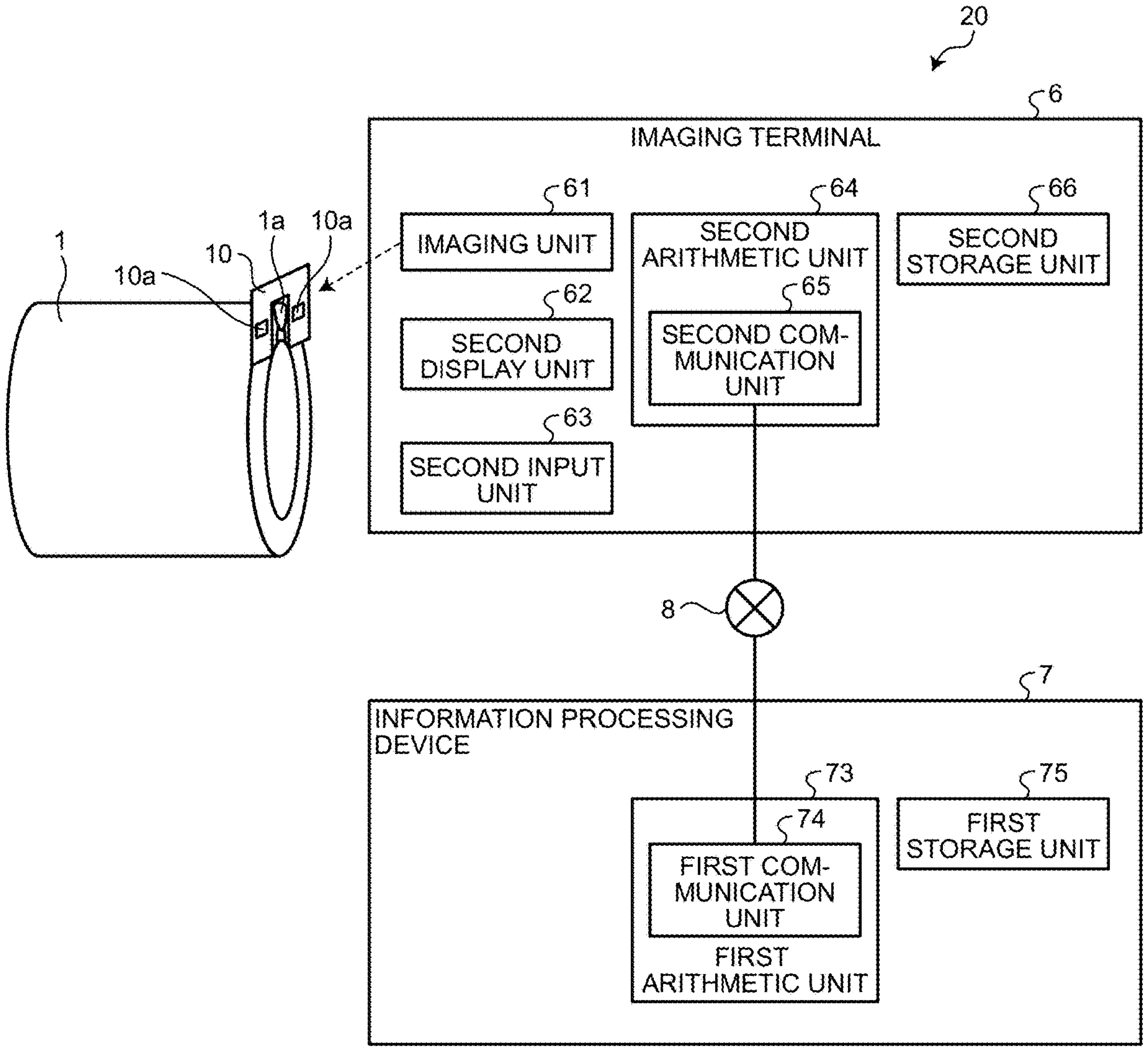
FIG. 19 illustrates a main part configuration of a misalignment measurement system according to a third embodiment.

FIG. 19 illustrates a main part configuration of a misalignment measurement system 20 according to the third embodiment.

The misalignment measurement system according to the third embodiment includes an imaging terminal 6, an information processing device 7, a repeater 8, and a marker plate 10. The imaging terminal 6 is, for example, a computer including an imaging unit 61, a second display unit 62, a second input unit 63, a second arithmetic unit 64, a second communication unit 65, and a second storage unit 66. In the embodiment, a case where the smartphone is used as the imaging terminal 6 will be described. Furthermore, the imaging terminal 6 constitutes an imaging system for measuring misalignment of a bead portion 1*a* of a cross section in a welded portion of a welded steel pipe 1 together with the marker plate 10. The information processing device 7 is, for example, a computer including at least a first arithmetic unit 73, a first communication unit 74, and a first storage unit 75. The second communication unit 65 and the first communication unit 74 respectively provided in the imaging terminal 6 and the information processing device 7 enable the imaging terminal 6 and the information processing device 7 to wirelessly communicate with each other via the repeater 8. Note that the second communication unit 65 and the first communication unit 74 may enable the imaging terminal 6 and the information processing device 7 to directly communicate with each other by short-range wireless communication without the repeater 8.

In the misalignment measurement system 20 according to the third embodiment, the imaging terminal 6 and the information processing device 7 are not limited to being in the same facility at the time when misalignment is measured. For example, the imaging terminal 6 and the information processing device 7 may be in different facilities of a host company. Furthermore, the imaging terminal 6 may be in a facility of the host company, and the information processing device 7 may be in a facility of another company. Furthermore, the imaging terminal 6 may be in the facility of the other company, and the information processing device 7 may be in the facility of the host company. That is, positions of the imaging terminal 6 and the information processing device 7 at the time when misalignment is measured are not particularly limited as long as the imaging terminal 6 and the information processing device 7 can wirelessly communicate with each other via the repeater 8.

Figure 20:
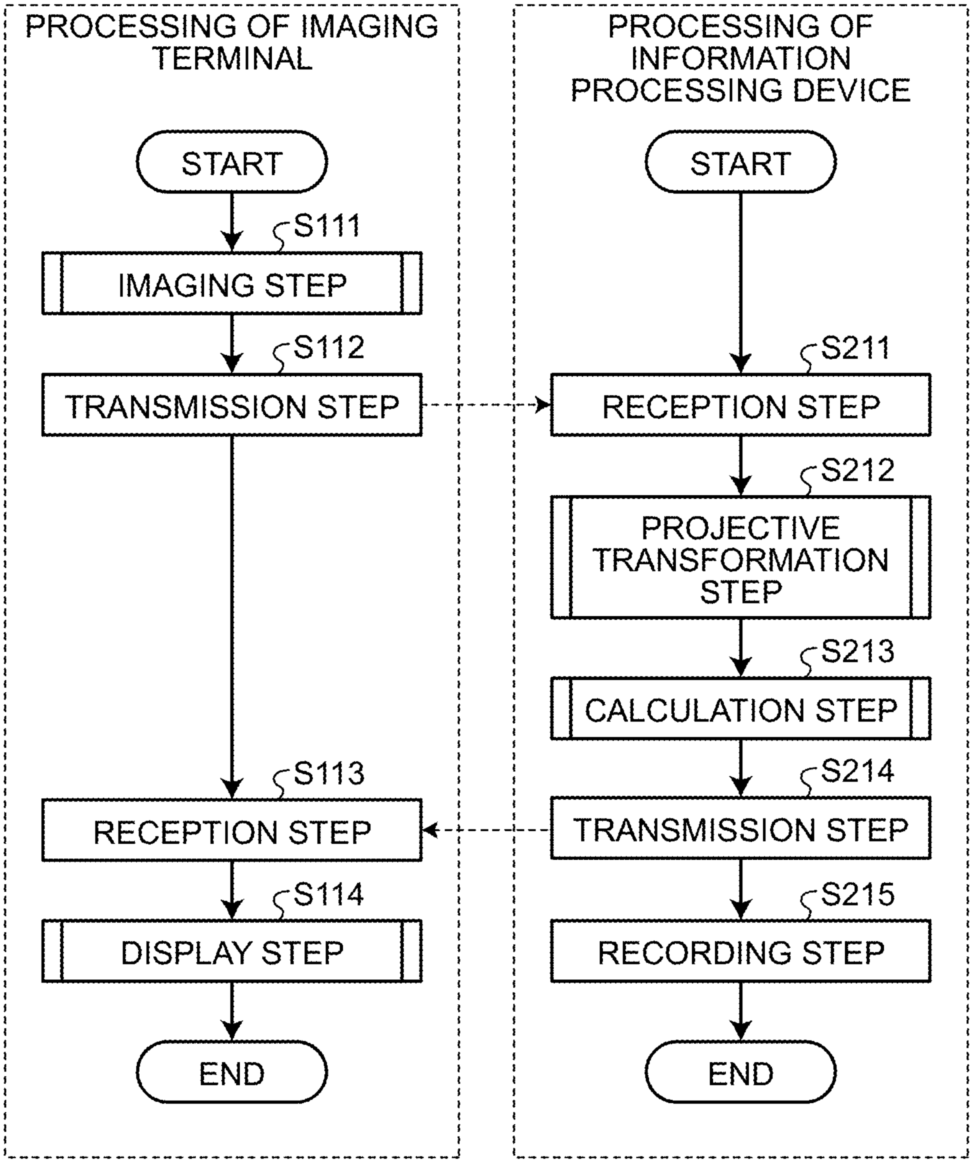
FIG. 20 is a flowchart illustrating one example of processing of an imaging terminal and processing of an information processing device performed by the misalignment measurement system according to the third embodiment.

FIG. 20 is a flowchart illustrating one example of processing of the imaging terminal 6 and processing of the information processing device 7 performed by the misalignment measurement system 20 according to the third embodiment. Note that an imaging step S111, a projective transformation step S212, a calculation step S213, and a display step S114 in FIG. 20 are similar to the imaging step S1, the projective transformation step S2, the calculation step S3, and the display step S4 in FIG. 3.

In the misalignment measurement system 20 according to the third embodiment, first, the bead portion 1*a* and the marker plate 10 in the cross section of the welded portion of the welded steel pipe 1 to be measured are imaged by the imaging unit 61 of the imaging terminal 6 (imaging step S111). Next, the imaging terminal 6 causes the second communication unit 65 to transmit information necessary for projectively transforming the image data and calculating a misalignment amount to the first communication unit 74 of the information processing device 7 via the repeater 8 (transmission step S112).

Note that the information necessary for projectively transforming the image data and calculating a misalignment amount, transmitted from the imaging terminal 6 to the information processing device 7, includes image data captured by the imaging unit 61. Furthermore, the necessary information includes parameters at the time of processing in the information processing device 7. Examples of the parameters include a type, a position, an angle, a size, and an identifier, which are information on the pattern 10*a* arranged on the marker plate 10. Moreover, the parameter includes color and thickness of a writing instrument used in the bead/base material boundary marking step, a resolution in the projective transformation step S212, a threshold of handwriting extraction in the calculation step S213, and an initial value necessary for the another piece of processing. It is preferable that these parameters of processing can be designated by the operator operating the second input unit 63 of the imaging terminal 6.

Furthermore, the necessary information includes basic information such as information on the date, time, and place of imaging, a person who performs imaging, and equipment used for imaging and information on the welded steel pipe 1. The information on the equipment used for imaging includes, for example, information on an identifier and an IP address of the equipment. The information on the welded steel pipe 1 includes, for example, information for identifying the welded steel pipe 1, such as a product number, a product name, a lot number, and a standard, and information characterizing the welded steel pipe 1.

Next, the information processing device 7 causes the first communication unit 74 to receive the necessary information from the second communication unit 65 of the imaging terminal 6 via the repeater 8. Next, the information processing device 7 causes the first arithmetic unit 73 to projectively transform the captured image data (projective transformation step S212). Next, the information processing device 7 causes the first arithmetic unit 73 to perform image processing for calculating a misalignment amount by using the image data after the projective transformation and calculate the misalignment amount (calculation step S213). Next, the information processing device 7 causes the first communication unit 74 to transmit information on the calculated misalignment amount to the second communication unit 65 of the imaging terminal 6 via the repeater 8 (transmission step S214). Thereafter, the information processing device 7 records the information received from the imaging terminal 6 and the information calculated by the information processing device 7 in the first storage unit 75 (recording step S215).

Next, the imaging terminal 6 causes the second communication unit 65 to receive information on the calculated misalignment amount from the first communication unit 74 of the information processing device 7 via the repeater 8 (reception step S113). Thereafter, the imaging terminal 6 displays the information on the calculated misalignment amount on the second display unit 62 (display step S114).

Note that the information on the calculated misalignment, transmitted from the information processing device 7 to the imaging terminal 6, includes the following. For example, the information on the calculated misalignment includes processing result image data. The processing result image data includes image data obtained by adding a value of a misalignment amount and an auxiliary line serving as a basis of calculation of the misalignment amount to image data captured by the imaging unit 61 of the imaging terminal 6 or image data obtained by projectively transforming the image data. In this case, the imaging terminal 6 can display the received image data on the second display unit 62 as it is. Moreover, for example, the information on the calculated misalignment includes processing result text data. The processing result text data includes text data of the value of the misalignment amount, text data of coordinate information of the auxiliary line serving as a basis of calculation of the misalignment amount, and text data on parameters of projective transformation. In this case, the imaging terminal 6 can display information obtained by analyzing the received text data on the second display unit 62. Moreover, it is preferable that the imaging terminal 6 processes image data previously transmitted to the information processing device 7 to create image data in which a value of a misalignment amount and an auxiliary line serving as a basis of calculation of the misalignment amount are added and displays the image data on the second display unit 62.

Fourth Embodiment

A fourth embodiment of the misalignment measurement system, the welded steel pipe manufacturing facility, the misalignment measurement method, the welded steel pipe manufacturing method, and the welded steel pipe quality control method according to the present invention will be described below. Note that, in the fourth embodiment, description similar to that of the second embodiment will be appropriately omitted.

Figure 21:
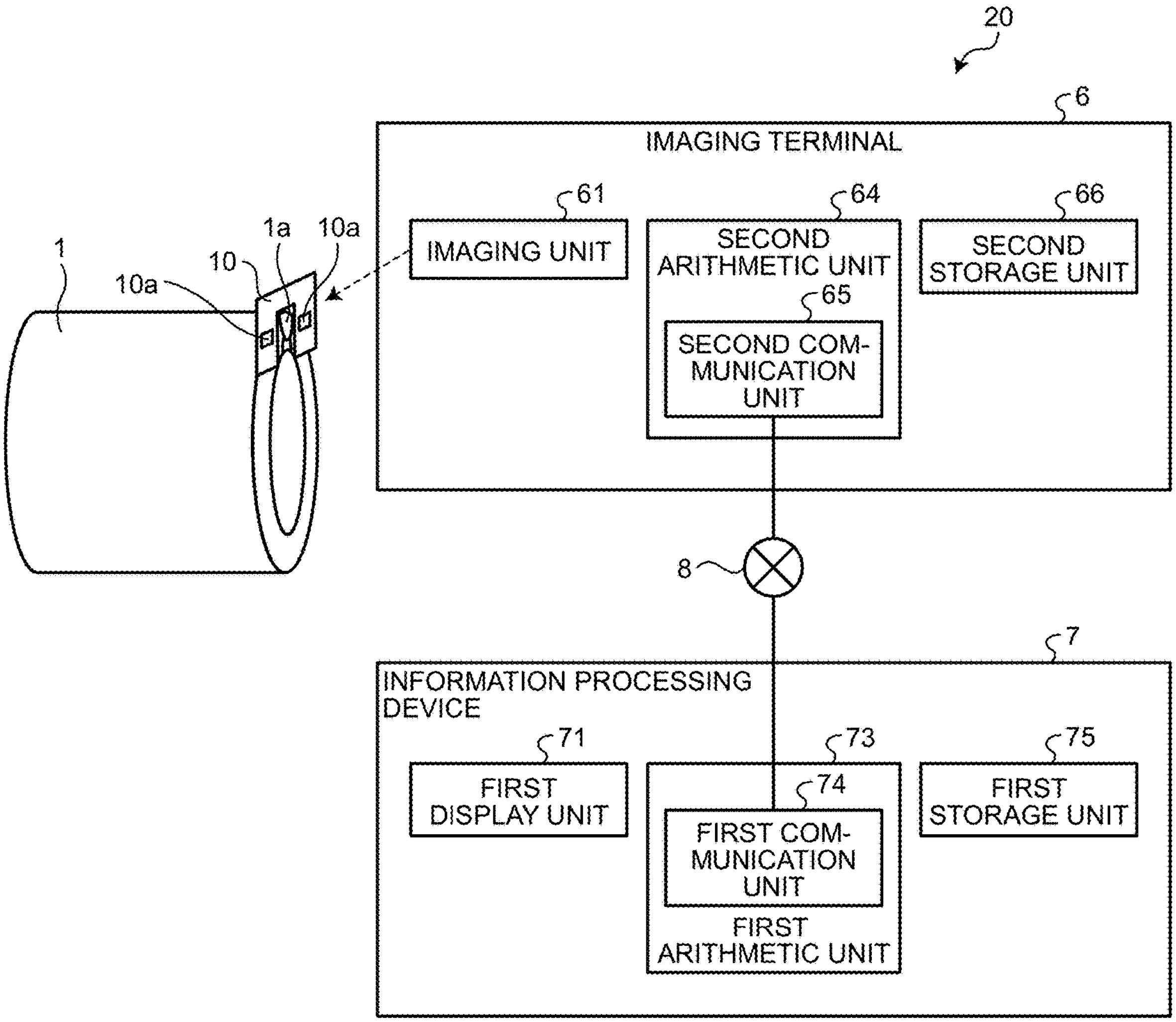
FIG. 21 illustrates a main part configuration of a misalignment measurement system according to a fourth embodiment.

FIG. 21 illustrates a main part configuration of a misalignment measurement system 20 according to the fourth embodiment.

The misalignment measurement system 20 according to the fourth embodiment includes an imaging terminal 6, an information processing device 7, a repeater 8, and a marker plate 10. The imaging terminal 6 is, for example, a computer including an imaging unit 61, a second arithmetic unit 64, a second communication unit 65, and a second storage unit 66. In the embodiment, a case where a digital camera equipped with a wireless communication function is used as the imaging terminal 6 will be described. Furthermore, the imaging terminal 6 constitutes an imaging system for measuring misalignment of a bead portion 1*a* of a cross section in a welded portion of a welded steel pipe 1 together with the marker plate 10. The information processing device 7 is, for example, a computer including at least a first display unit 71, a first arithmetic unit 73, a first communication unit 74, and a first storage unit 75. The second communication unit 65 and the first communication unit 74 respectively provided in the imaging terminal 6 and the information processing device 7 enable the imaging terminal 6 and the information processing device 7 to wirelessly communicate with each other via the repeater 8. Note that the second communication unit 65 and the first communication unit 74 may enable the imaging terminal 6 and the information processing device 7 to directly communicate with each other by short-range wireless communication without the repeater 8.

In the misalignment measurement system 20 according to the fourth embodiment, the imaging terminal 6 and the information processing device 7 are not limited to being in the same facility at the time when misalignment is measured. For example, the imaging terminal 6 and the information processing device 7 may be in different facilities of a host company. Furthermore, the imaging terminal 6 may be in a facility of the host company, and the information processing device 7 may be in a facility of another company. Furthermore, the imaging terminal 6 may be in the facility of the other company, and the information processing device 7 may be in the facility of the host company. That is, positions of the imaging terminal 6 and the information processing device 7 at the time when misalignment is measured are not particularly limited as long as the imaging terminal 6 and the information processing device 7 can wirelessly communicate with each other via the repeater 8.

Figure 22:
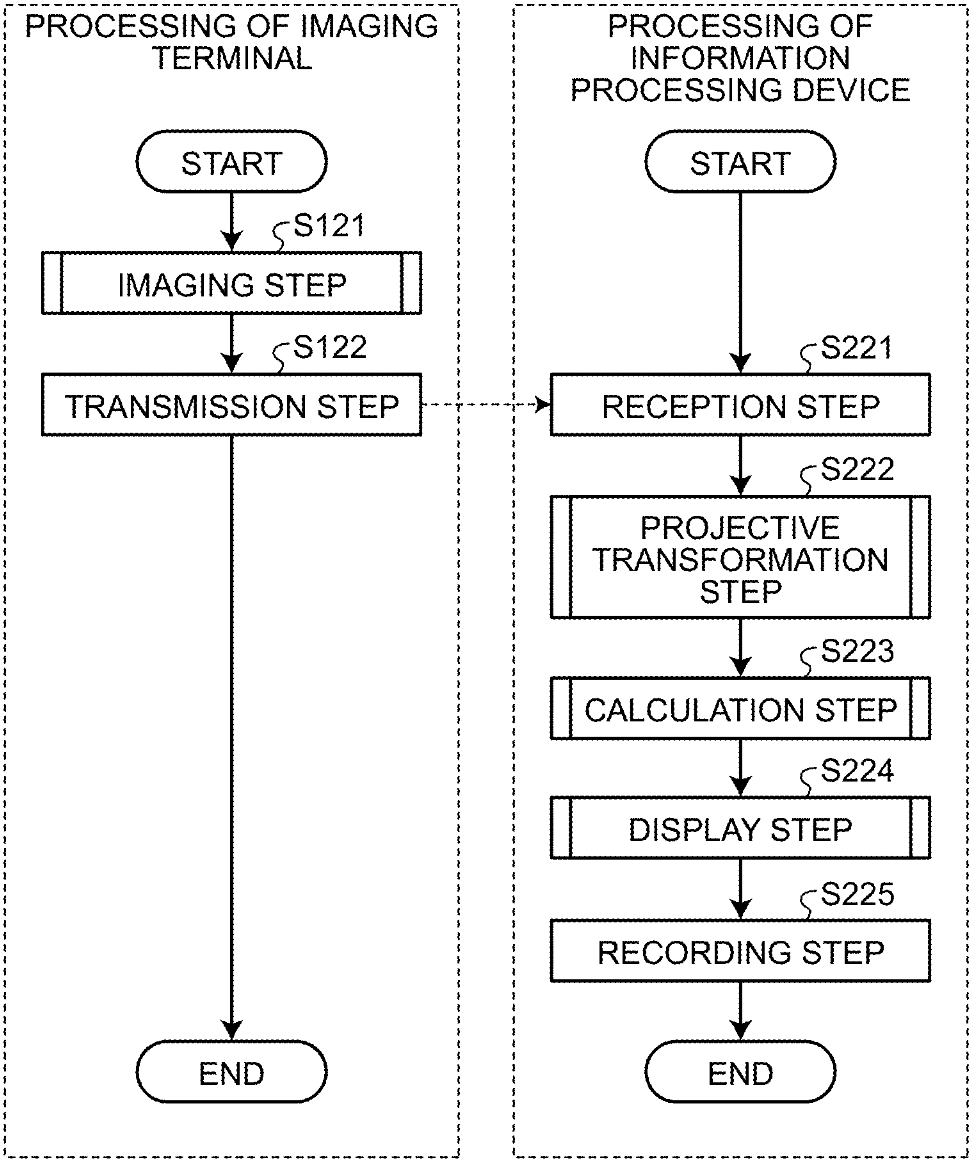
FIG. 22 is a flowchart illustrating one example of processing of an imaging terminal and processing of an information processing device performed by the misalignment measurement system according to the fourth embodiment.

FIG. 22 is a flowchart illustrating one example of processing of the imaging terminal 6 and processing of the information processing device 7 performed by the misalignment measurement system 20 according to the fourth embodiment. Note that an imaging step S121, a projective transformation step S222, a calculation step S223, and a display step S224 in FIG. 22 are similar to the imaging step S1, the projective transformation step S2, the calculation step S3, and the display step S4 in FIG. 3.

In the misalignment measurement system 20 according to the fourth embodiment, first, the bead portion 1*a* and the marker plate 10 in the cross section of the welded portion of the welded steel pipe 1 to be measured are imaged by the imaging unit 61 of the imaging terminal 6 (imaging step S121). Next, the imaging terminal 6 causes the second communication unit 65 to transmit information to the first communication unit 74 of the information processing device 7 via the repeater 8 (transmission step S122). Note that the information transmitted from the imaging terminal 6 to the information processing device 7 includes, for example, image data captured by the imaging unit 61.

Next, the information processing device 7 causes the first communication unit 74 to receive the information including the image data from the second communication unit 65 of the imaging terminal 6 via the repeater 8 (reception step S221). Next, the information processing device 7 causes the first arithmetic unit 73 to projectively transform the received image data (projective transformation step S222). Next, the information processing device 7 causes the first arithmetic unit 73 to perform image processing for calculating a misalignment amount by using the image data after the projective transformation and calculate the misalignment amount (calculation step S223). Next, the information processing device 7 causes the first display unit 71 to display information on the calculated misalignment amount (display step S224). Thereafter, the information processing device 7 records the information received from the imaging terminal 6 and the information calculated by the first arithmetic unit 73 in the first storage unit 75.

Note that, for the parameters at the time of processing in the information processing device 7, it is necessary to preliminarily determine one parameter, select a parameter from a plurality of options, or set a predetermined value for each piece of processing. Examples of the parameters include a type, a position, an angle, a size, and an identifier, which are information on the pattern 10*a* arranged on the marker plate 10. Moreover, the parameter includes color and thickness of a writing instrument used in the above-mentioned bead/base material boundary marking step, a resolution in the projective transformation step S222, a threshold of handwriting extraction in the calculation step S223, and an initial value necessary for another piece of processing.

Furthermore, it is necessary to input basic information at the time when each image is captured by the imaging terminal 6 to the information processing device 7. The basic information includes basic information such as information on the date, time, and place of imaging, a person who performs imaging, and the imaging terminal 6 and information on the welded steel pipe 1. The information on the imaging terminal 6 includes, for example, information on an identifier and an IP address of the imaging terminal 6. Furthermore, the information on the imaging terminal 6 is stored in, for example, the second storage unit 66 of the imaging terminal 6, and is transmitted from the second communication unit 65 to the first communication unit 74 of the information processing device 7 together with the image data captured by the imaging unit 61. The information on the welded steel pipe 1 includes, for example, information for identifying the welded steel pipe 1, such as a product number, a product name, a lot number, and a standard, and information characterizing the welded steel pipe 1. The information on the welded steel pipe 1 is transmitted from an external device to the information processing device 7 via the repeater 8 by wireless communication, for example.

Fifth Embodiment

A fifth embodiment of the misalignment measurement system, the welded steel pipe manufacturing facility, the misalignment measurement method, the welded steel pipe manufacturing method, and the welded steel pipe quality control method according to the present invention will be described below. Note that, in the fifth embodiment, description similar to that of the second embodiment will be appropriately omitted.

Figure 23:
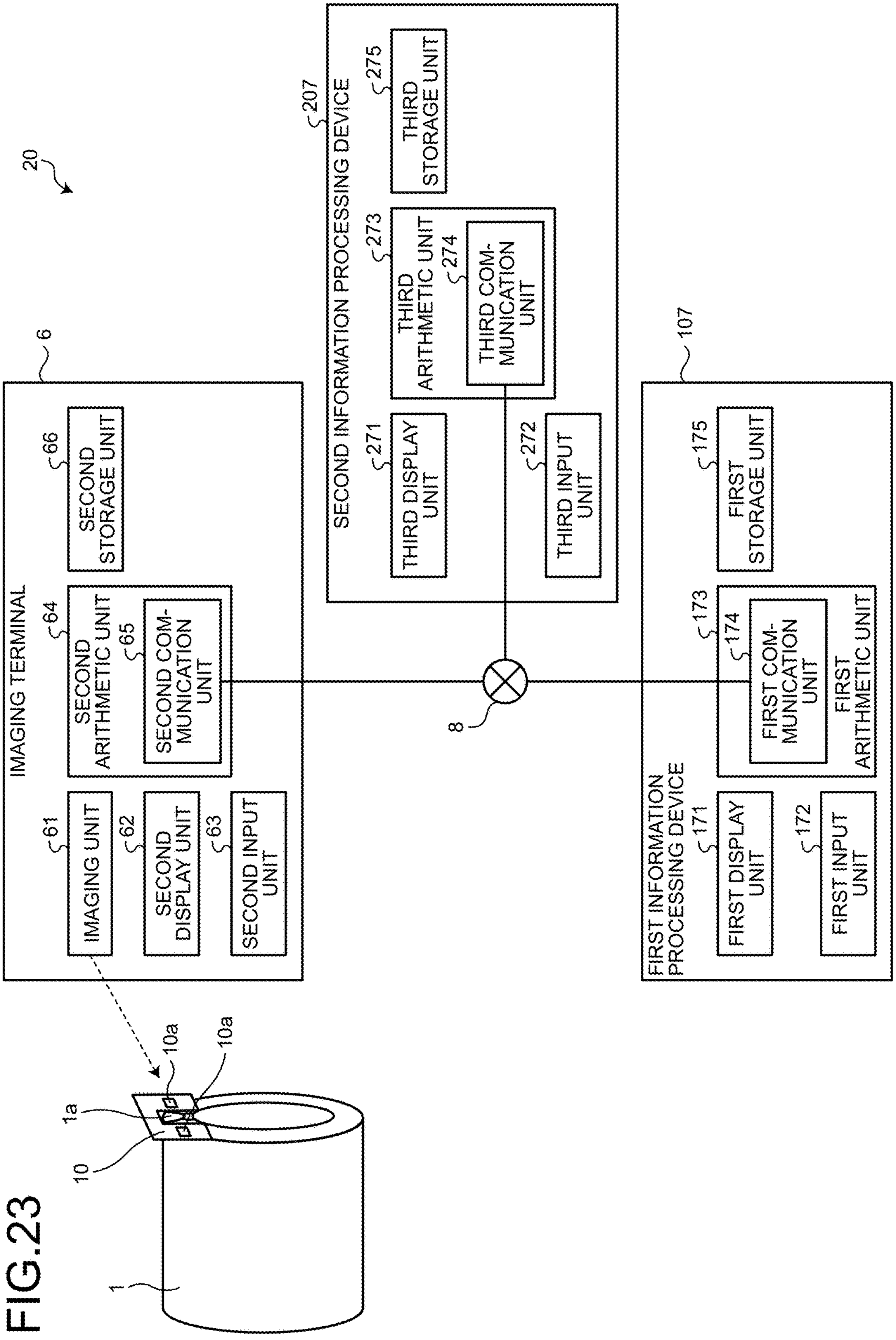
FIG. 23 illustrates a main part configuration of a misalignment measurement system according to a fifth embodiment.

FIG. 23 illustrates a main part configuration of a misalignment measurement system 20 according to the fifth embodiment.

The misalignment measurement system 20 according to the fifth embodiment includes an imaging terminal 6, a first information processing device 107, a second information processing device 207, a repeater 8, and a marker plate 10.

The imaging terminal 6 is, for example, a computer including an imaging unit 61, a second display unit 62, a second input unit 63, a second arithmetic unit 64, a second communication unit 65, and a second storage unit 66. In the embodiment, a case where the smartphone is used as the imaging terminal 6 will be described. Note that the imaging terminal 6 constitutes an imaging system for measuring misalignment of a bead portion 1*a* of a cross section in a welded portion of a welded steel pipe 1 together with the marker plate 10.

The first information processing device 107 is, for example, a computer including at least a first display unit 171, a first input unit 172, a first arithmetic unit 173, a first communication unit 174, and a first storage unit 175. Note that the first information processing device 107 corresponds to the information processing device 7 of the misalignment measurement system 20 according to the second embodiment.

The second information processing device 207 is, for example, a computer including at least a third display unit 271, a third input unit 272, a third arithmetic unit 273, a third communication unit 274, and a third storage unit 275. Note that the third display unit 271, the third input unit 272, the third arithmetic unit 273, the third communication unit 274, and the third storage unit 275 have functions equivalent to those of the first display unit 71, the first input unit 172, the first arithmetic unit 173, the first communication unit 174, and the first storage unit 175.

The second communication unit 65, the first communication unit 174, and the third communication unit 274 respectively provided in the imaging terminal 6, the first information processing device 107, and the second information processing device 207 enable the imaging terminal 6, the first information processing device 107, and the second information processing device 207 to wirelessly communicate with one another via the repeater 8. Note that the second communication unit 65, the first communication unit 174, and the third communication unit 274 may enable the imaging terminal 6, the first information processing device 107, and the second information processing device 207 to directly communicate with one another by short-range wireless communication without the repeater 8.

In the misalignment measurement system 20 according to the fifth embodiment, the imaging terminal 6, the first information processing device 107, and the second information processing device 207 are not limited to being in the same facility at the time when misalignment is measured. For example, the imaging terminal 6, the first information processing device 107, and the second information processing device 207 may be in different facilities of a host company. Furthermore, the imaging terminal 6 and the first information processing device 107 may be in different facilities of the host company, and the second information processing device 207 may be in a facility of another company. Furthermore, the imaging terminal 6 and the second information processing device 207 may be in a facility of the host company, and the first information processing device 107 may be in the facility of the other company. Furthermore, the imaging terminal 6 and the first information processing device 107 may be in the facility of the other company, and the second information processing device 207 may be in the facility of the host company. Furthermore, the imaging terminal 6 and the second information processing device 207 may be in the facility of the other company, and the first information processing device 107 may be in the facility of the host company. Furthermore, the imaging terminal 6 may be in the facility of the other company, and the first information processing device 107 and the second information processing device 207 may be in the facility of the host company. That is, positions of the imaging terminal 6, the first information processing device 107, and the second information processing device 207 at the time when misalignment is measured are not particularly limited as long as the imaging terminal 6, the first information processing device 107, and the second information processing device 207 can wirelessly communicate with one another via the repeater 8.

Figure 24:
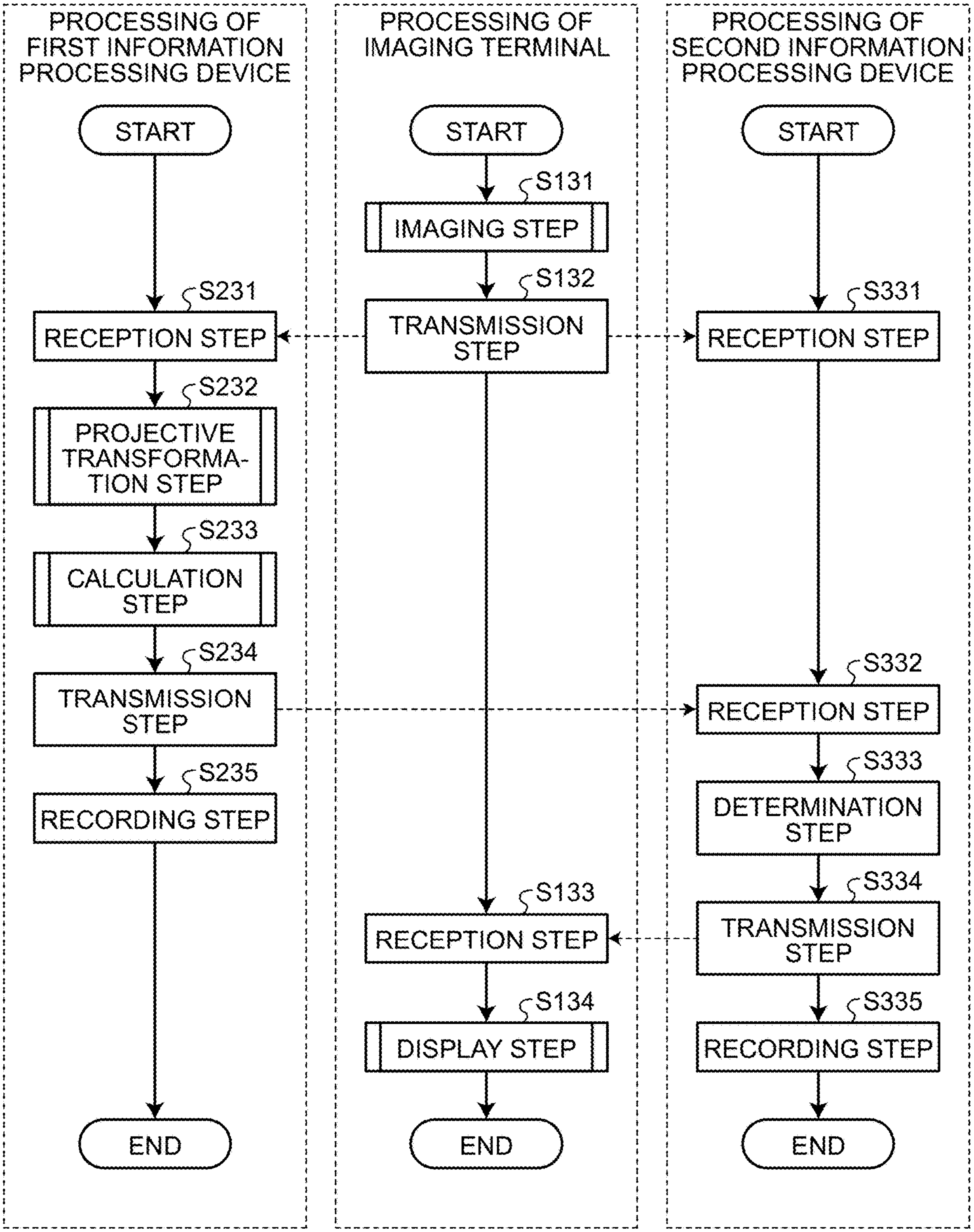
FIG. 24 is a flowchart illustrating one example of processing of an imaging terminal, processing of a first information processing device, and processing of a second information processing device performed by the misalignment measurement system according to the fifth embodiment.

FIG. 24 is a flowchart illustrating one example of processing of the imaging terminal 6, processing of the first information processing device 107, and processing of the second information processing device 207 performed by the misalignment measurement system 20 according to the fifth embodiment. Note that an imaging step S131, a projective transformation step S232, a calculation step S233, and a display step S134 in FIG. 24 are similar to the imaging step S1, the projective transformation step S2, the calculation step S3, and the display step S4 in FIG. 3.

In the misalignment measurement system 20 according to the fifth embodiment, first, the bead portion 1*a* and the marker plate 10 in the cross section of the welded portion of the welded steel pipe 1 to be measured are imaged by the imaging unit 61 of the imaging terminal 6 (imaging step S131). Next, the imaging terminal 6 causes the second communication unit 65 to transmit information to each of the first communication unit 174 of the first information processing device 107 and the third communication unit 274 of the second information processing device 207 via the repeater 8 (transmission step S132). The first information processing device 107 causes the first communication unit 174 to receive the information from the second communication unit 65 of the imaging terminal 6 via the repeater 8 (reception step S231). Furthermore, the second information processing device 207 causes the third communication unit 274 to receive the information from the second communication unit 65 of the imaging terminal 6 via the repeater 8 (reception step S331).

Note that the information transmitted from the imaging terminal 6 to the first information processing device 107 includes, for example, image data captured by the imaging unit 61. Furthermore, the information transmitted from the imaging terminal 6 to the first information processing device 107 includes parameters at the time of processing in the imaging terminal 6. Examples of the parameters include a type, a position, an angle, a size, and an identifier, which are information on the pattern 10*a* arranged on the marker plate 10. Moreover, the parameter includes color and thickness of a writing instrument used in the bead/base material boundary marking step, a resolution in the projective transformation step S232, a threshold of handwriting extraction in the calculation step S233, and an initial value necessary for another piece of processing. It is preferable that these parameters of processing can be designated by the operator operating the second input unit 63 of the imaging terminal 6.

Furthermore, the information transmitted from the imaging terminal 6 to the second information processing device 207 includes basic information at the time when each image is captured by the imaging terminal 6. The basic information includes basic information such as information on the date, time, and place of imaging, a person who performs imaging, and the imaging terminal 6 and information on the welded steel pipe 1. The information on the imaging terminal 6 includes, for example, information on an identifier and an IP address of the imaging terminal 6 stored in the second storage unit 66. The information on the welded steel pipe 1 includes, for example, information for identifying the welded steel pipe 1, such as a product number, a product name, a lot number, and a standard, and information characterizing the welded steel pipe 1. Note that, for example, the operator inputs the information on the welded steel pipe 1 by using the second input unit 63 of the imaging terminal 6. Furthermore, the information transmitted from the imaging terminal 6 to the second information processing device 207 includes, for example, an ID of image data captured by the imaging terminal 6.

Next, the first information processing device 107 causes the first arithmetic unit 173 to projectively transform the received image data (projective transformation step S232). Next, the first information processing device 107 causes the first arithmetic unit 173 to perform image processing for calculating a misalignment amount by using the image data after the projective transformation and calculate the misalignment amount (calculation step S233). Next, the first information processing device 107 causes the first communication unit 174 to transmit information on the calculated misalignment amount to the third communication unit 274 of the second information processing device 207 via the repeater 8 (transmission step S234). Thereafter, the first information processing device 107 records information on the calculated misalignment amount in the first storage unit 175 (recording step S235).

Note that the information on the calculated misalignment includes the following. That is, the information on the calculated misalignment includes, for example, processing result image data. The processing result image data includes image data obtained by adding a value of a misalignment amount and an auxiliary line serving as a basis of calculation of the misalignment amount to image data captured by the imaging unit 61 of the imaging terminal 6 or image data obtained by projectively transforming the image data. Furthermore, the information on the calculated misalignment includes, for example, processing result text data. The processing result text data includes text data of the value of the misalignment amount, text data of coordinate information of the auxiliary line serving as a basis of calculation of the misalignment amount, and text data on parameters of projective transformation. Moreover, the information on the calculated misalignment includes, for example, an ID of image data captured by the imaging terminal 6.

Next, the second information processing device 207 causes the third communication unit 274 to receive the information on the calculated misalignment amount from the first communication unit 174 of the first information processing device 107 via the repeater 8 (reception step S332). Next, the second information processing device 207 causes the third arithmetic unit 273 to determine the acceptance of the welded steel pipe 1 having the bead portion 1*a* imaged by the imaging terminal 6 based on, for example, the information on the calculated misalignment amount (determination step S333). Next, the second information processing device 207 causes the third communication unit 274 to transmit information on control of the welded steel pipe 1 based on the calculated misalignment amount, including the information on the determination of the acceptance of the welded steel pipe 1, to the second communication unit 65 of the imaging terminal 6 via the repeater 8 (transmission step S334). Thereafter, the second information processing device 207 records the information on the determination of the acceptance of the welded steel pipe 1 in the third storage unit 275 (recording step S335).

Note that the information on control of the welded steel pipe 1 based on the calculated misalignment amount includes information on processing performed on the welded steel pipe 1 in stock in addition to the information on the determination of the acceptance of the welded steel pipe 1. Furthermore, the information on control of the welded steel pipe 1 based on the calculated misalignment amount may be transmitted from the second information processing device 207 to, for example, a computer provided in a facility of manufacturing the welded steel pipe 1 to be used for changing a condition of manufacturing the welded steel pipe 1.

Next, the imaging terminal 6 causes the second communication unit 65 to receive the information on the determination of the acceptance of the welded steel pipe 1 from the third communication unit 274 of the second information processing device 207 via the repeater 8 (reception step S133). Thereafter, the imaging terminal 6 displays the information on the determination of the acceptance of the welded steel pipe 1 on the second display unit 62 (display step S134).

Note that, in the misalignment measurement system 20 according to the fifth embodiment, the information on the determination of the acceptance of the welded steel pipe 1 made by the second information processing device 207 is not limited to be transmitted to the imaging terminal 6 in real time after the acceptance determination. For example, the operator operates the second input unit of the imaging terminal 6 to transmit information such as an ID of image data corresponding to the welded steel pipe 1 for which a result of acceptance determination is desired to be known to the second information processing device 207, and requests information on the determination of the acceptance of the welded steel pipe 1. Then, the second information processing device 207 transmits, to the imaging terminal 6, the information on the determination of the acceptance of the welded steel pipe 1, corresponding to an ID of received image data recorded in the third storage unit 275 based on information such as the ID of the image data. This enables quality control by inspecting the determination of the acceptance of the welded steel pipe 1 at any timing from when the operator measures misalignment of the welded steel pipe 1 with the imaging terminal 6 to when the welded steel pipe 1 is shipped as a product.

The misalignment measurement methods according to the first to fifth embodiments enable efficient misalignment measurement by being introduced to a process of manufacturing a welded steel pipe. In general, misalignment is manually measured, and such measurement takes time due to complicated work. Time taken for measuring the misalignment amount d can be reduced by introducing the misalignment measurement system 20 for the welded steel pipe 1 in, for example, FIGS. 1 and 15 to a measurement process of a process of manufacturing the welded steel pipe 1 and measuring misalignment of the welded steel pipe 1 in accordance with the above-mentioned procedure.

EXAMPLE

Figure 25:
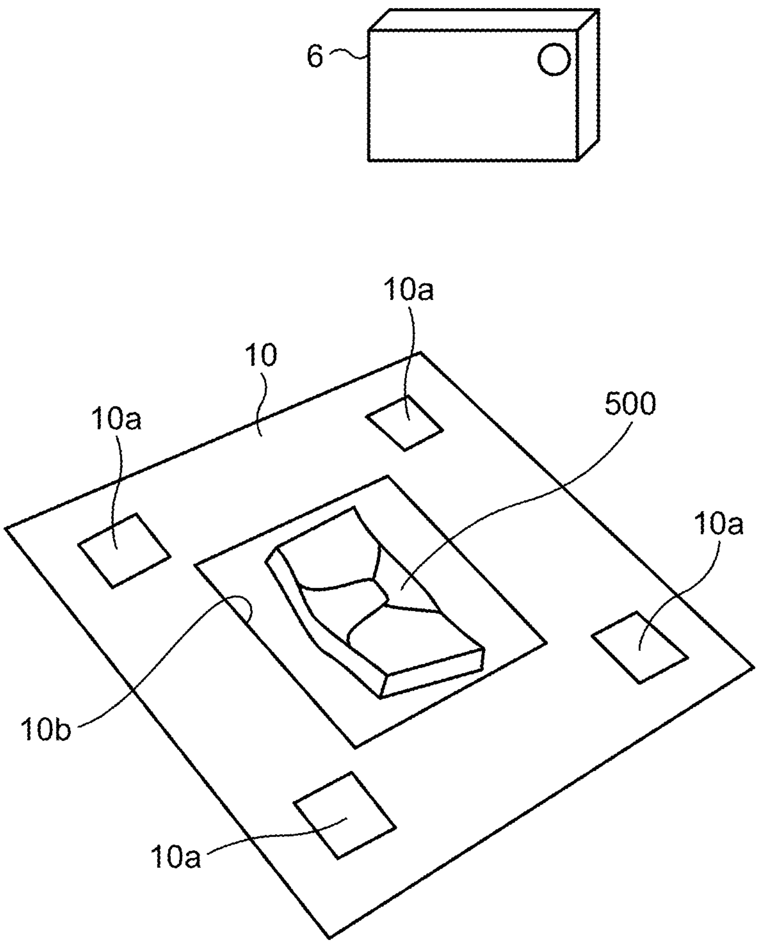
FIG. 25 illustrates a test configuration of an example of the present invention.

FIG. 25 illustrates a test configuration according to an example to which a misalignment measurement method of the present invention is applied. Note that a reference sign 500 in FIG. 25 denotes a cutout sample of a bead portion of an end surface of a welded steel pipe used in a test. In the test, a marker plate 10 on which four patterns 10*a* were attached was used. The four patterns 10*a* are arranged so as to be inscribed in each vertex of a square having a side of 130 [mm], and have sides of a length of 20 [mm]. An opening 10*b* cut in a shape of a square having a side of 80 [mm] is formed in a central portion of the marker plate 10. A boundary of a welded portion and a base material of the sample 500 was preliminarily traced with a pen of a predetermined color, and disposed in the opening 10*b* of the marker plate 10. Then, the sample 500 and the marker plate 10 were imaged by the imaging terminal 6, and a misalignment amount was measured in accordance with the procedure of a misalignment measurement method according to the above-mentioned embodiments.

Figure 26:
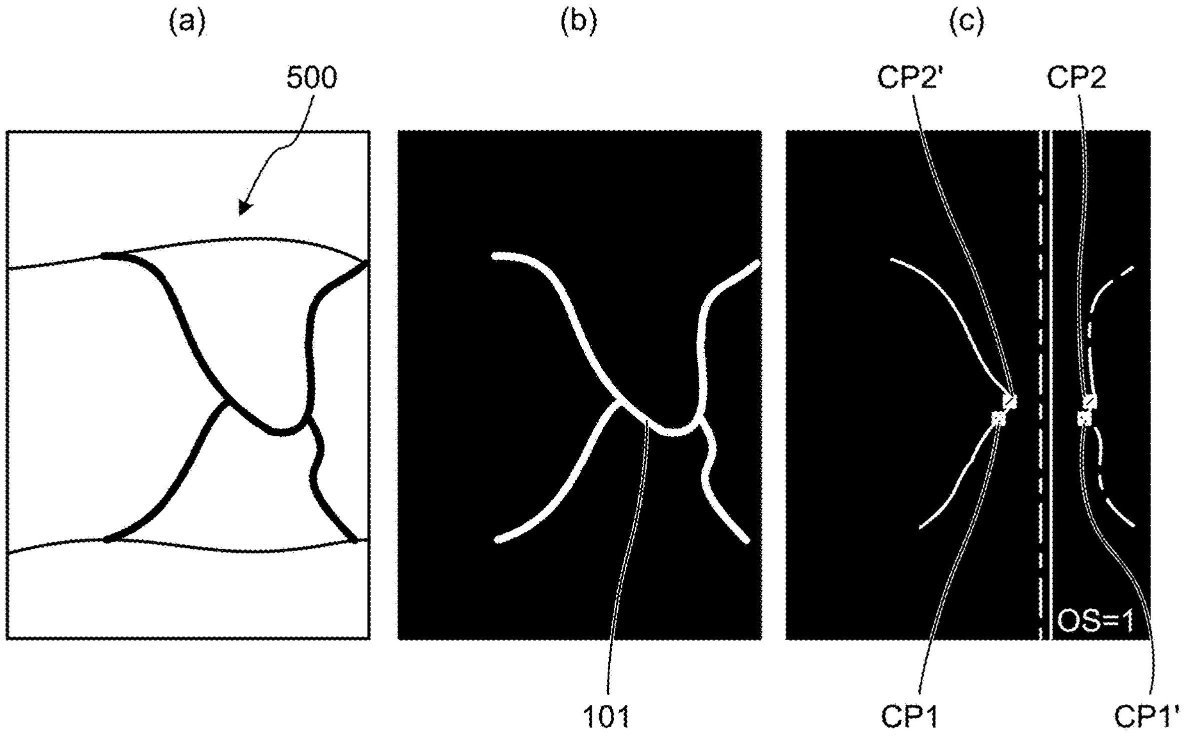
FIG. 26(*a*) illustrates image data of a cross section of a sample captured by an imaging terminal.

FIG. 26(*a*) illustrates image data of a cross section of the welded portion of the sample 500 captured by the imaging terminal 6. FIG. 26(*b*) illustrates a boundary of the welded portion and the base material of the sample 500. FIG. 26(*c*) illustrates a left boundary, a right boundary, and respective intersections CP1, CP1', CP2, and CP2'.

In the example, it has been successfully confirmed that the shape of the boundary of the welded portion and the base material of the sample 500 can be acquired as illustrated in FIG. 26(*b*) for the image data of the cross section of the welded portion of the sample 500 captured by the imaging terminal 6 in FIG. 26(*a*). Furthermore, as illustrated in FIG. 26(*c*), it has been successfully confirmed that the left boundary and the right boundary have been successfully detected and that the respective intersections CP1, CP1', CP2, and CP2' have been successfully detected.

Figure 27:
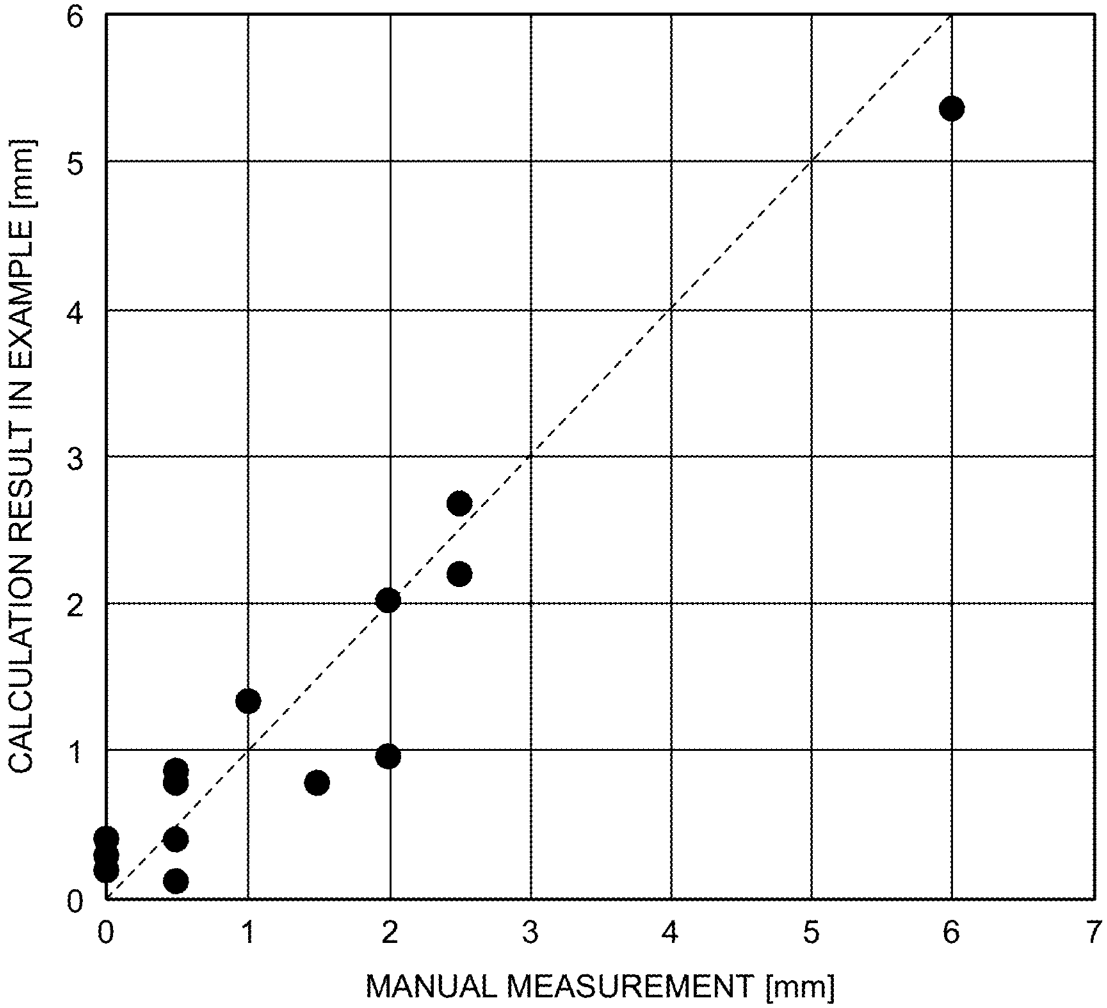
FIG. 27 illustrates the relation between a manually measured misalignment amount and a misalignment amount calculated in the example of the present invention.

FIG. 27 illustrates the relation between a misalignment amount calculation result in the example and a measurement result through manual measurement. Note that a graph indicated by a dotted line in FIG. 27 illustrates a case where the misalignment amount measurement result through manual measurement and the misalignment amount calculation result in the example have the same value.

An actually measured value of the misalignment amount measured by manually measuring the sample 500 was 2.0 [mm] while the misalignment amount calculation result in the example was 1.9 [mm]. Furthermore, the misalignment amount calculation result in the example and the manually measured misalignment amount exhibited a strong positive correlation, and R2=92 was established. Furthermore, an error between the misalignment amount calculation result in the example and the manually measured misalignment amount was 0.55 [mm] on average and 1 [mm] at a maximum.

Here, the present invention can be applied as a misalignment measurement system constituting a welded steel pipe manufacturing facility. The misalignment measurement system according to the present invention may measure misalignment of a welded steel pipe manufactured by a known or existing manufacturing facility.

Furthermore, the present invention can be applied as a misalignment measurement step of a welded steel pipe manufacturing method, and may measure misalignment of a welded steel pipe in a known or existing manufacturing step.

Moreover, the present invention can be applied to a welded steel pipe quality control method, and may control the quality of the welded steel pipe by measuring misalignment of the welded steel pipe. Specifically, the present invention can measure misalignment of a welded steel pipe in the misalignment measurement step, and control the quality of the welded steel pipe based on a measurement result obtained in the misalignment measurement step. In the subsequent quality control step, whether or not the misalignment amount satisfies a preliminarily designated control standard is determined based on the measurement result obtained in the misalignment measurement step, and the quality of the welded steel pipe is controlled. According to such a welded steel pipe quality control method, a high-quality welded steel pipe can be provided.

INDUSTRIAL APPLICABILITY

As described above, the present invention can provide a misalignment measurement system, a welded steel pipe manufacturing facility, an imaging terminal, an imaging system, an information processing device, a misalignment measurement method, a welded steel pipe manufacturing method, and a welded steel pipe quality control method capable of automatically measuring misalignment based on the shape of a boundary of a bead portion and a base material in a cross section of a welded portion.

REFERENCE SIGNS LIST

1 WELDED STEEL PIPE
1*a* BEAD PORTION
1*b* BASE MATERIAL PORTION
1*c*, 1*c*-LL, 1*c*-LR, 1*c*-UL, 1*c*-UR BOUNDARY
2 IMAGING UNIT
3 ARITHMETIC DEVICE
4 DISPLAY DEVICE
5 STORAGE DEVICE
6 IMAGING TERMINAL
7 INFORMATION PROCESSING DEVICE
8 REPEATER
9 EXTERNAL STORAGE DEVICE
10 MARKER PLATE
10*a* PATTERN
10*b* OPENING
11 OUTER SURFACE
12 INNER SURFACE
20 MISALIGNMENT MEASUREMENT SYSTEM
61 IMAGING UNIT
62 SECOND DISPLAY UNIT
63 SECOND INPUT UNIT
64 SECOND ARITHMETIC UNIT
65 SECOND COMMUNICATION UNIT
66 SECOND STORAGE UNIT
71, 171 FIRST DISPLAY UNIT
72, 172 FIRST INPUT UNIT
73, 173 FIRST ARITHMETIC UNIT
74, 174 FIRST COMMUNICATION UNIT
75, 175 FIRST STORAGE UNIT
101 MARKING REGION
102, 103 POINT
107 FIRST INFORMATION PROCESSING DEVICE
111 LEFT EDGE
112 RIGHT EDGE
121, 122 CANDIDATE POINT
207 SECOND INFORMATION PROCESSING DEVICE
271 THIRD DISPLAY UNIT
272 THIRD INPUT UNIT
273 THIRD ARITHMETIC UNIT
274 THIRD COMMUNICATION UNIT
275 THIRD STORAGE UNIT
500 SAMPLE

The invention claimed is:

1. A misalignment measurement system comprising:
a marker plate on which a pattern serving as a length reference for length measurement is drawn;
an imaging sensor configured to image, as image data together with the marker plate, a bead portion in a cross section of a welded portion on which the marker plate is provided; and
a processor configured to calculate a misalignment amount of the bead portion based on a shape of a boundary of the bead portion and a base material in the cross section of the welded portion in the image data captured by the imaging sensor.

2. The misalignment measurement system according to claim 1, further comprising an imaging terminal including the imaging sensor and the processor.

3. The misalignment measurement system according to claim 1, wherein a marker for three-dimensional survey is drawn on the marker plate as the pattern.

4. A welded steel pipe manufacturing facility comprising:
a manufacturing facility configured to manufacture a welded steel pipe; and
the misalignment measurement system according to claim 1 configured to measure misalignment for a welded portion of a welded steel pipe manufactured in the manufacturing facility.

5. An imaging terminal comprising:
an imaging sensor configured to image, as image data together with an external marker plate, a bead portion in a cross section of a welded portion on which the external marker plate is provided, wherein a pattern serving as a length reference for length measurement is drawn on the external marker plate; and
a second processor configured to execute at least one of:
processing of outputting the image data that has been captured to an external first processor configured to execute processing of calculating a misalignment amount of the bead portion based on a shape of a boundary of the bead portion and a base material in the cross section of the welded portion in the image data; and
processing of calculating a misalignment amount of the bead portion based on the shape of the boundary of the bead portion and the base material in the cross section of the welded portion in the image data that has been captured.

6. An imaging system for measuring misalignment of the bead portion, comprising:
a marker plate on which a pattern serving as a length reference for length measurement is drawn; and an imaging terminal configured to image a bead portion in a cross section of a welded portion on which the marker plate is provided, the imaging terminal including:

an imaging sensor configured to image the bead portion as image data together with the marker plate; and a second processor configured to execute processing of outputting the image data that has been captured to an external first processor configured to execute processing of calculating a misalignment amount of the bead portion based on a shape of a boundary of the bead portion and a base material in the cross section of the welded portion in the image data.

7. An information processing device comprising a first processor configured to:

execute processing of calculating a misalignment amount of a bead portion based on a shape of a boundary of the bead portion and a base material in a cross section of a welded portion in image data in which the bead portion in the cross section of the welded portion on which an external marker plate is provided is imaged together with the marker plate, wherein a pattern serving as a length reference for length measurement is drawn on the external marker plate, and execute processing of outputting the misalignment amount that has been calculated to a preset target.

8. An information processing device comprising a third processor configured to execute at least one of:

processing of determining a degree of quality of a product including a welded portion of a bead portion whole misalignment amount has been calculated based on a shape of a boundary of the bead portion and a base material in the cross section of the welded portion, based on a misalignment amount of the bead portion in the cross section of the welded portion on which an external marker plate is provided calculated from image data in which the bead portion is imaged together with the marker plate, a pattern serving as a length reference for length measurement being drawn on the external marker plate; and processing of transmitting information on control regarding the product based on the calculated misalignment amount, to a computer provided in a facility of manufacturing the product, for changing a manufacturing condition of the product.

9. A misalignment measurement method comprising:

a projective transformation step of projectively transforming image data in which a bead portion in a cross section of a welded portion on which a marker plate is provided is imaged together with the marker plate, wherein a pattern serving as a length reference for length measurement is drawn on the marker plate; and a misalignment amount calculation step of calculating a misalignment amount of the bead portion from a shape of a boundary of the bead portion and a base material in the cross section of the welded portion in image data after projective transformation.

10. The misalignment measurement method according to claim 9, further comprising an imaging step of imaging the bead portion as image data together with the marker plate before the projective transformation step.

11. The misalignment measurement method according to claim 10, wherein an imaging condition in the imaging step is changed based on information including at least the misalignment amount.

12. A welded steel pipe manufacturing method comprising:

a manufacturing step of a welded steel pipe; and a measurement step of measuring misalignment for a welded portion of the welded steel pipe manufactured in the manufacturing step by the misalignment measurement method according to claim 9.

13. A welded steel pipe quality control method comprising:

a measurement step of measuring misalignment for a welded portion of a welded steel pipe by the misalignment measurement method according to claim 9; and a quality control step of controlling quality of the welded steel pipe based on a result of measurement of misalignment of the welded portion obtained by the measurement step.

14. A welded steel pipe manufacturing method comprising:

a manufacturing step of a welded steel pipe; and a control step of controlling a manufacturing condition of the manufacturing step based on a plurality of pieces of information including a misalignment amount of the bead portion calculated from a shape of a boundary of a bead portion and a base material in a cross section of a welded portion in image data in which the bead portion in the cross section of the welded portion of the welded steel pipe is imaged together with an external marker plate, wherein a pattern serving as a length reference for length measurement is drawn on the marker plate, and the external marker plate is provided on the cross section of the welded portion.

15. A welded steel pipe quality control method comprising a quality control step of controlling quality of a welded steel pipe based on a plurality of pieces of information including a misalignment amount of the bead portion calculated from a shape of a boundary of a bead portion and a base material in a cross section of a welded portion in image data in which the bead portion in the cross section of the welded portion of the welded steel pipe is imaged together with an external marker plate, wherein a pattern serving as a length reference for length measurement is drawn on the marker plate, and the external marker plate is provided on a cross section of the welded portion.

* * * * *